(12) United States Patent
Nishida et al.

(10) Patent No.: US 11,208,091 B2
(45) Date of Patent: *Dec. 28, 2021

(54) VEHICLE CONTROL DEVICE

(71) Applicant: TOYOTA JIDOSHA KABUSHIKI KAISHA, Toyota (JP)

(72) Inventors: Takayuki Nishida, Toyota (JP); Kenji Gotoda, Nagakute (JP); Hiroki Kuwamoto, Toyota (JP); Tomoya Takeuchi, Okazaki (JP); Taku Harada, Nisshin (JP); Akira Nakata, Toyota (JP); Kenji Miyasaka, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 467 days.

This patent is subject to a terminal disclaimer.

(21) Appl. No.: 16/243,380

(22) Filed: Jan. 9, 2019

(65) Prior Publication Data

US 2019/0210587 A1  Jul. 11, 2019

(30) Foreign Application Priority Data

Jan. 9, 2018  (JP) .............................. JP2018-001528

(51) Int. Cl.
 B60W 20/10 (2016.01)
 B60W 10/06 (2006.01)
 (Continued)

(52) U.S. Cl.
 CPC .............. B60W 20/10 (2013.01); B60K 6/26 (2013.01); B60W 10/06 (2013.01); B60W 10/08 (2013.01);
 (Continued)

(58) Field of Classification Search
 CPC .................................................... B60W 20/10
 See application file for complete search history.

(56) References Cited

U.S. PATENT DOCUMENTS 8,857,272 B2 * 10/2014 Goetting ............. B60L 15/2054
 73/862.321
8,939,127 B1 * 1/2015 Tsukada .............. F02D 41/0002
 123/376
(Continued)

FOREIGN PATENT DOCUMENTS

CN 108082173 A 5/2018
JP 2011-230707 A 11/2011
(Continued)

OTHER PUBLICATIONS

Jan. 10, 2020 Notice of Allowance issued in U.S. Appl. No. 15/795,661.

*Primary Examiner* — Michael A Berns
(74) *Attorney, Agent, or Firm* — Oliff PLC

(57) ABSTRACT

A vehicle control device for a vehicle provides a predetermined control based on the rotational characteristic, the vehicle including a rotation lock mechanism preventing rotation of a coupling portion of the rotating member coupled to the engine on the engine side of the rotating member in at least one direction, the vehicle control device comprising: a characteristic detecting portion detecting the rotational characteristic by applying a torque to the rotating member from the electric motor to measure a twist angle of the rotating member while the rotation of the coupling portion is prevented by the rotation lock mechanism; and a characteristic correspondence control portion setting a control value related to an engine rotation speed based on the rotational characteristic detected by the characteristic detecting portion to provide the predetermined control by using the control value.

9 Claims, 12 Drawing Sheets

(51) Int. Cl.
  *B60W 10/08* (2006.01)
  *B60K 6/26* (2007.10)
  *B60K 6/46* (2007.10)
  *B60K 6/40* (2007.10)

(52) U.S. Cl.
  CPC .................. *B60K 6/40* (2013.01); *B60K 6/46* (2013.01); *B60K 2006/268* (2013.01); *B60W 2400/00* (2013.01); *B60W 2710/0644* (2013.01); *B60W 2710/0666* (2013.01); *B60W 2710/083* (2013.01); *B60Y 2200/92* (2013.01); *B60Y 2300/192* (2013.01)

(56) References Cited

U.S. PATENT DOCUMENTS

| | | | |
|---|---|---|---|
| 9,233,685 B2 * | 1/2016 | Kanayama | B60K 6/36 |
| 9,248,831 B2 * | 2/2016 | Hayashi | B60W 10/02 |
| 10,604,146 B2 * | 3/2020 | Gotoda | B60K 6/20 |
| 2012/0152670 A1 * | 6/2012 | Chauvet | F16F 15/027 188/266.2 |
| 2013/0074609 A1 | 3/2013 | Goetting | |
| 2015/0321660 A1 | 11/2015 | Kanayama et al. | |
| 2015/0321661 A1 | 11/2015 | Hayashi et al. | |
| 2018/0134278 A1 | 5/2018 | Gotoda | |
| 2019/0210587 A1 * | 7/2019 | Nishida | B60W 20/15 |
| 2019/0217852 A1 * | 7/2019 | Komoda | B60W 10/08 |
| 2019/0232949 A1 * | 8/2019 | Takasu | B60K 6/387 |

FOREIGN PATENT DOCUMENTS

| | | |
|---|---|---|
| JP | 2013-539530 A | 10/2013 |
| JP | 2016-107673 A | 6/2016 |
| JP | 2016-182841 A | 10/2016 |
| JP | 2016-215946 A | 12/2016 |
| WO | 2014/122744 A1 | 8/2014 |

* cited by examiner

VEHICLE CONTROL DEVICE

The disclosure of Japanese Patent Application No. 2018-001528 filed on Jan. 9, 2018 including the specification, drawings and abstract is incorporated herein by reference in its entirety.

BACKGROUND OF THE INVENTION

Field of the Invention

The present invention relates to a vehicle control device and, more particularly, to an improvement of a vehicle control device using rotational characteristics of a rotating member such as a damper device for controlling a vehicle.

Description of the Related Art

There is known a vehicle that includes an engine, an electric motor, and a rotating member disposed between the engine and the electric motor and having rotational characteristics related to an input torque. For example, the rotating member is a damper device absorbing rotational vibration of the engine or a power transmission shaft having predetermined rigidity, and the rotational characteristics are a rigidity value corresponding to a rate of a change in the input torque to a change in twist angle, a hysteresis that is a difference in the input torque when the twist angle increases and decreases, a backlash dimension that is a change amount of the twist angle at the time of reversal between positive and negative in the input torque, etc. In some cases, power performance, vibration, noise, etc. are affected by the rotational characteristics of the rotating member. Therefore, efforts are made to improve power performance, vibration, noise, etc. based on the rotational characteristics in terms of both hardware and control. For example, in Patent Document 1, to prevent resonance from occurring in a vehicle due to rigidity of a damper device when an electric motor is used as a drive power source for running, a technique is proposed for changing a torque of the electric motor so as to change the rigidity value of the damper device based on a relationship (rotational characteristics) between the input torque and the rigidity value of the damper device.

CITATION LIST

Patent Document 1: Japanese Laid-Open Patent Publication No. 2016-107673

SUMMARY OF THE INVENTION

Technical Problem

However, if the rotational characteristics vary due to an individual difference, a temporal change, etc. of the rotating member, a desired effect cannot be obtained from control based on predefined rotational characteristics, which may result in deterioration in power performance or NV (noise, vibration) performance of the vehicle due to resonance etc.

The present invention was conceived in view of the situations and it is therefore an object of the present invention to properly provide control based on rotational characteristics regardless of variations in the rotational characteristics due to an individual difference etc. of a rotating member.

Solution to Problem

To achieve the above object, a first aspect of the present invention provides a vehicle control device applied to a vehicle including (a) an engine, an electric motor, and a rotating member disposed between the engine and the electric motor with a rotational characteristic related to an input torque, (b) the vehicle control device providing a predetermined control based on the rotational characteristic, (c) the vehicle including a rotation lock mechanism preventing rotation of a coupling portion of the rotating member coupled to the engine on the engine side of the rotating member in at least one direction, the vehicle control device comprising: (d) a characteristic detecting portion detecting the rotational characteristic by applying a torque to the rotating member from the electric motor to measure a twist angle of the rotating member while the rotation of the coupling portion is prevented by the rotation lock mechanism; and (e) a characteristic correspondence control portion setting a control value related to an engine rotation speed based on the rotational characteristic detected by the characteristic detecting portion to provide the predetermined control by using the control value.

A second aspect of the present invention provides the vehicle control device recited in the first aspect of the invention, wherein (a) the characteristic detecting portion detects as the rotational characteristic at least a rigidity value corresponding to a rate of a change in input torque to a change in twist angle of the rotating member, and wherein (b) the characteristic correspondence control portion makes the control value higher or lower to avoid a resonance band determined depending on the rigidity value.

A third aspect of the present invention provides the vehicle control device recited in the first or second aspect of the invention, wherein (a) the characteristic detecting portion detects as the rotational characteristic at least a hysteresis that is a difference in input torque when the twist angle increases and decreases, and wherein (b) the characteristic correspondence control portion makes the control value higher when the hysteresis is large or makes the control value lower to avoid a resonance band.

A fourth aspect of the present invention provides the vehicle control device recited in the first aspect of the invention, wherein (a) the vehicle is a hybrid vehicle having a second electric motor used as a drive power source coupled to a power transmission path between the rotating member and driving wheels, wherein (b) the characteristic detecting portion detects as the rotational characteristic a rigidity value corresponding to a rate of a change in input torque to a change in twist angle of the rotating member and a hysteresis that is a difference in input torque when the twist angle increases and decreases, wherein (c) the characteristic correspondence control portion includes an engine running control portion that, when the second electric motor having a torque near zero is dragged and rotated while the engine is used as a drive power source for running, sets an engine rotation speed as the control value depending on the rigidity value and the hysteresis such that the engine rotation speed is increased when the rigidity value is high as compared to when the rigidity value is low, and the engine rotation speed is increased when the hysteresis is large as compared to when the hysteresis is small. The fourth aspect of the invention is substantially an embodiment of the second and third aspects of the invention.

It is noted that the torque near zero is intended to include the case of applying a slight torque for preventing backlash of a gear.

A fifth aspect of the present invention provides the vehicle control device recited in the first aspect of the invention, wherein (a) the characteristic detecting portion detects as the rotational characteristic a rigidity value corresponding to a rate of a change in input torque to a change in twist angle of the rotating member and a hysteresis that is a difference in input torque when the twist angle increases and decreases, wherein (b) the characteristic correspondence control portion includes an engine start control portion setting a cranking termination determination value depending on the rigidity value and the hysteresis such that the cranking termination determination value is increased when the rigidity value is high as compared to when the rigidity value is low, and the cranking termination determination value is increased when the hysteresis is large as compared to when the hysteresis is small, and wherein (c) the cranking termination determination value is used for terminating cranking in relation to an engine rotation speed when the engine is cranked and started by the electric motor. The fifth aspect of the invention is substantially an embodiment of the second and third aspects of the invention.

A sixth aspect of the present invention provides the vehicle control device recited in the first aspect of the invention, wherein (a) the characteristic detecting portion detects as the rotational characteristic a rigidity value corresponding to a rate of a change in input torque to a change in twist angle of the rotating member and a hysteresis that is a difference in input torque when the twist angle increases and decreases, wherein (b) the characteristic correspondence control portion includes an engine stop control portion setting a stop torque cancellation determination value depending on the rigidity value and the hysteresis such that the stop torque cancellation determination value is increased when the rigidity value is high as compared to when the rigidity value is low, and the stop torque cancellation determination value is increased when the hysteresis is large as compared to when the hysteresis is small, and wherein (c) the stop torque cancellation determination value is used for cancelling a stop torque is related to an engine rotation speed when the stop torque is applied by the electric motor to the engine to stop rotation. The sixth aspect of the invention is substantially an embodiment of the second and third aspects of the invention.

A seventh aspect of the present invention provides the vehicle control device recited in the first aspect of the invention, wherein (a) the characteristic detecting portion detects as the rotational characteristic a rigidity value corresponding to a rate of a change in input torque to a change in twist angle of the rotating member and a hysteresis that is a difference in input torque when the twist angle increases and decreases, wherein (b) the characteristic correspondence control portion includes an idle rotation control portion setting an idle rotation speed as the control value depending on the rigidity value and the hysteresis such that the idle rotation speed is increased when the rigidity value is high as compared to when the rigidity value is low, and the idle rotation speed is increased when the hysteresis is large as compared to when the hysteresis is small. The seventh aspect of the invention is substantially an embodiment of the second and third aspects of the invention.

An eighth aspect of the present invention provides the vehicle control device recited in the first aspect of the invention, wherein the idle rotation control portion separately sets an idle rotation speed during idling for a catalyst warm-up operation and an idle rotation speed during normal idling for other than the catalyst warm-up operation depending on the rigidity value and the hysteresis to control the idle rotation speed.

Advantageous Effects of Invention

In the vehicle control device as described above, the rotational characteristics are detected by applying the torque to the rotating member through the control of the electric motor to measure the twist angle of the rotating member while the rotation of the coupling portion on the engine side of the rotating member is locked by the rotation lock mechanism, and the control values related to the engine rotation speed are set based on the detected rotational characteristics, so that controls related to the engine rotation speed is properly provided based on the actual rotational characteristics regardless of variations due to an individual difference of the rotational characteristics etc. of the rotating member. In other words, based on the actual rotational characteristics of the rotating member, the control values related to the engine rotation speed are set to optimal values depending on required performance such as power performance, NV performance, and fuel consumption.

The vehicle control device recited in the second aspect of the invention detects as the rotational characteristic at least a rigidity value, and makes the control value higher or lower to avoid the resonance band determined depending on the rigidity value. Since a higher rigidity value of the rotating member generally leads to a higher resonance band, the control value related to the engine rotation speed is made higher (increased) or lower (decreased) depending on the rigidity value, so that the engine rotation speed can avoid the resonance band, and the predetermined NV performance can be ensured. In other words, the control value related to the engine rotation speed can be set to an optimum value depending on the actual rigidity value of the rotating member in accordance with required performance such as power performance and fuel consumption while ensuring the predetermined NV performance.

The vehicle control device recited in the third aspect of the invention detects as the rotational characteristic at least a hysteresis, and makes the control value higher when the hysteresis is large or makes the control value lower to avoid the resonance band. Since a large hysteresis of the rotating member generally deteriorates damping performance, the control value related to the engine rotation speed is made higher to reduce the vibration of the engine itself so that the predetermined NV performance can be ensured regardless of the deterioration in the damping performance. Additionally, by lowering the control value related to the engine rotation speed depending on the hysteresis, the resonance band can be avoided to ensure the predetermined NV performance. In other words, the control value related to the engine rotation speed can be set to an optimum value depending on the actual hysteresis of the rotating member in accordance with required performance such as power performance and fuel consumption while ensuring the predetermined NV performance.

The vehicle control device recited in the fourth aspect of the invention relates to the hybrid vehicle having the second electric motor used as a drive power source, detects as the rotational characteristic the rigidity value and the hysteresis, when the second electric motor having a torque near zero is dragged and rotated while the engine is used as a drive power source for running, the vehicle control device sets the engine rotation speed as the control value depending on the rigidity value and the hysteresis such that the engine rotation speed is increased when the rigidity value is high as compared to when the rigidity value is low, and the engine rotation speed is increased when the hysteresis is large as compared to when the hysteresis is small. If the rigidity value of the rotating member is high or if the hysteresis is large, the rotating member generally deteriorates in damping performance so that a larger rattling sound is generated at a gear meshing portion etc. by dragging of the second electric motor by the engine due to rotational vibration of the engine; however, since the engine rotation speed defined as the control value is made higher, the vibration of the engine itself is reduced, and therefore, the occurrence of rattling sound is suppressed regardless of the deterioration in the damping performance so that a predetermined NV performance can be ensured. The engine rotation speed defined as the control value has an optimum value determined in consideration of power performance, fuel consumption, etc. while suppressing the occurrence of rattling sound to ensure the predetermined NV performance.

The vehicle control device recited in the fifth aspect of the invention detects as the rotational characteristic the rigidity value and the hysteresis, the vehicle control device sets the cranking termination determination value depending on the rigidity value and the hysteresis such that the cranking termination determination value is increased when the rigidity value is high as compared to when the rigidity value is low, and the cranking termination determination value is increased when the hysteresis is large as compared to when the hysteresis is small, wherein the cranking termination determination value (control value) is used when the engine is cranked and started by the electric motor. Although the higher rigidity value of the rotating member generally makes the resonance band higher and the larger hysteresis generally deteriorates the damping performance, the cranking termination determination value is made higher in such a case, and therefore, the engine rotation speed can quickly be increased by cranking of the engine to a higher rotation speed than the resonance band, so that the NV performance can be prevented from deteriorating due to resonance. The cranking termination determination value defined as the control value has an optimum value determined such that, for example, the engine rotation speed promptly passes through the resonance band as long as the engine can rotate in a self-sustaining manner, so that a cranking time (power consumption amount) of the electric motor can be considered while the predetermined NV performance is ensured.

The vehicle control device recited in the sixth aspect of the invention detects as the rotational characteristic the rigidity value and the hysteresis, the vehicle control device sets the stop torque cancellation determination value depending on the rigidity value and the hysteresis such that the stop torque cancellation determination value is increased when the rigidity value is high as compared to when the rigidity value is low, and the stop torque cancellation determination value is increased when the hysteresis is large as compared to when the hysteresis is small, wherein the stop torque cancellation determination value (control value) is used when the stop torque is applied by the electric motor to the engine to stop rotation. Although the higher rigidity value of the rotating member generally makes the resonance band higher and the larger hysteresis generally deteriorates the damping performance, the stop torque cancellation determination value is made higher in such a case, and therefore, the stop torque can be canceled as quickly as possible when the engine rotation speed falls below the resonance band, so that the NV performance can be prevented from deteriorating due to abnormal noises etc. generated by reverse rotation of the engine resulting from a delay in cancellation of the stop torque, while suppressing the resonance. The stop torque cancellation determination value defined as the control value has an optimum value determined such that, for example, the stop torque can be canceled as quickly as possible when the engine rotation speed falls below the resonance band so that the reverse rotation of the engine can be suppressed to ensure the predetermined NV performance.

The vehicle control device recited in the seventh aspect of the invention detects as the rotational characteristic the rigidity value and the hysteresis, the vehicle control device sets the idle rotation speed as the control value depending on the rigidity value and the hysteresis such that the idle rotation speed is increased when the rigidity value is high as compared to when the rigidity value is low, and the idle rotation speed is increased when the hysteresis is large as compared to when the hysteresis is small. Although the higher rigidity value of the rotating member generally makes the resonance band higher and the larger hysteresis generally deteriorates the damping performance, the idle rotation speed is made higher when the rigidity value is high or the hysteresis is large, and therefore, the idle rotation speed can be made higher than the resonance band, so that the NV performance can be prevented from deteriorating due to resonance etc. An optimum value of the idle rotation speed defined as the control value is determined in consideration of power performance, fuel consumption, etc. while suppressing the resonance at a rotation speed higher than the resonance band to ensure the predetermined NV performance.

The vehicle control device recited in the eighth aspect of the invention separately sets an idle rotation speed during idling for a catalyst warm-up operation and an idle rotation speed during the normal idling depending on the rigidity value of the rotating member and the hysteresis. Therefore, the idle rotation speed can more properly be controlled depending on whether the catalyst warm-up operation is performed.

DESCRIPTION OF THE PREFERRED EMBODIMENTS

Figure 1:
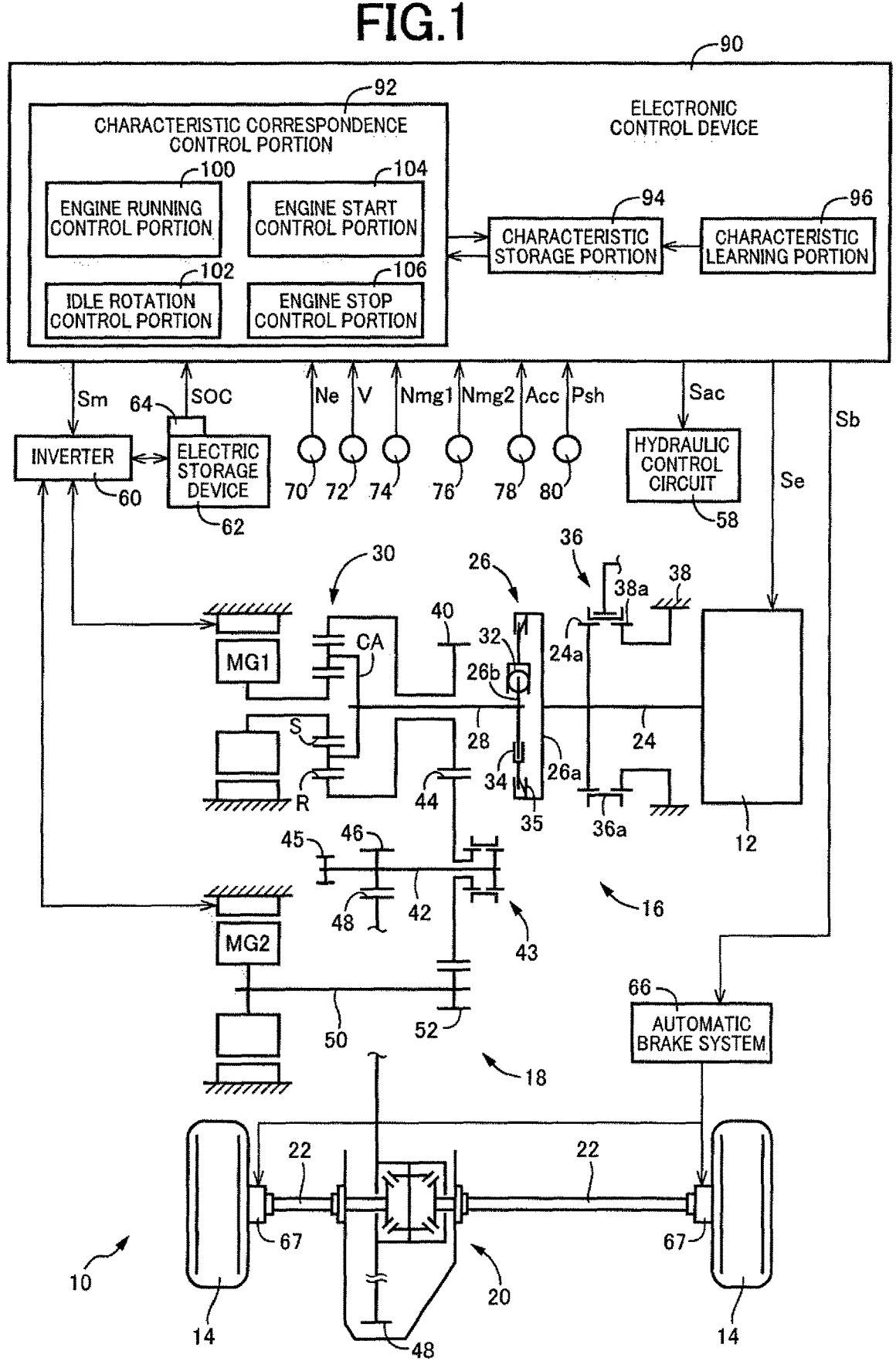
FIG. 1 is a skeleton diagram for explaining a drive system of a hybrid vehicle to which the present invention is applied, showing main portions of the control system together.

The engine is an internal combustion engine generating power from combustion of a fuel such as a gasoline engine and a diesel engine. For the electric motor, a motor generator also usable as an electric generator is suitably used. The rotating member having rotational characteristics for an input torque is a damper device absorbing rotational vibration of the engine or a power transmission shaft having predetermined torsional rigidity, for example. The damper device includes an elastic body such as a spring and a friction mechanism, for example, or may include either one of the elastic body and the friction mechanism. The rotational characteristics for the input torque of the rotating member are the rigidity value corresponding to a rate of a change in input torque to a change in twist angle, the hysteresis that is a difference in the input torque when the twist angle increases and decreases, the backlash dimension that is a change amount of the twist angle at the time of reversal between positive and negative in the input torque, etc., and the control value related to the engine rotation speed is set based on at least one of them. Regarding the rigidity, when the rigidity value varies stepwise depending on the input torque, a change point thereof is also one of the rotational characteristics.

For the rotation lock mechanism preventing rotation of the coupling portion on the engine side of the rotating member in the at least one direction, a friction brake of a hydraulic type etc., a meshing brake, or a one-way clutch etc. is suitably used. In the case of the one-way clutch, for example, the one-way clutch is disposed to prevent the rotation in a reverse rotation direction of the engine, otherwise, when power transmission between the engine and the rotating member is interrupted by a clutch etc., the rotation may be prevented in one arbitrary direction. The characteristic detecting portion detecting the rotational characteristics of the rotating member desirably detects the characteristic, for example, while the vehicle is stopped with the engine stopped and a vehicle speed being zero or can detect the characteristic during motor running while the second electric motor is used as the drive power source for running with the engine stopped. The detection may simply be executed at the time of vehicle inspection and the detected characteristic may be stored or may periodically be executed and updated (learned) based on a predetermined running distance or a running time and the detected characteristics may be successively replaced or used for learning, and other various forms are available. If temporal changes have a large influence, it is desirable to execute the learning periodically based on certain conditions.

If a drive power is generated when the rotational characteristics are detected, it is desirable to control the torque of the second electric motor usable as a drive power source to offset the drive power, however, in the case of detection of the rotational characteristics during stop of the vehicle, for example, the detection may be performed on condition that a depressing operation of a brake is performed, that a shift lever is operated to a P (parking) position to put a parking gear into an engaged state, or that a parking brake is in operation. If the vehicle includes an automatic brake system which automatically controls a brake force of a wheel brake, the wheel brake may be actuated. If a drive power fluctuation including that detected during running of the vehicle is slight, or in the case of the detection before the shipment of the vehicle or during vehicle inspecting, the offset control of the drive power may be omitted. The offset control may not necessarily completely eliminate the drive power fluctuation, and the drive power fluctuation is may be reduced.

The present invention is applied to, for example, a vehicle having a differential mechanism distributing an output of an engine to an electric motor and a driving wheel side and may be applied to various vehicles such as a vehicle having an engine and an electric motor connected in series across a rotating member such as a damper device and a vehicle transmitting outputs of an engine and an electric motor combined by a planetary gear device etc. toward driving wheels. A transmission gear and a connecting/disconnecting device such as a clutch etc. may be disposed as needed between the engine and the rotating member as well as between the rotating member and the electric motor. If the engine and the rotating member are directly coupled via a coupling shaft etc., the rotation in at least one direction prevented by the rotation lock mechanism is determined such that reverse rotation of the engine is prevented, and the characteristic detecting portion applies a torque in the reverse rotation direction to the rotating member; however, if the connecting/disconnecting device is disposed between the engine and the rotating member, the direction of the rotation of the rotating member to be prevented is not particularly limited. If rotation is prevented in both directions by the rotation lock mechanism, the direction of the torque applied to the rotating member is not necessarily limited at the time of the detection by the characteristic detecting portion. The rotational characteristics can be obtained also by changing the torque in both positive and negative directions.

For the rotational characteristics, both the rigidity value and the hysteresis are preferably detected as in the fourth to seventh aspects of the present invention, for example; however, only one of them may be detected. Since a higher rigidity value of the rotating member generally leads to a higher resonance band, it is preferable in terms of the NV performance to make the control value related to the engine rotation speed higher depending on the rigidity value such that the engine rotation speed becomes higher than the resonance band; however, the characteristic of the control value for the rigidity value is appropriately determined in consideration of required power performance, NV performance, fuel consumption, etc. Since a larger hysteresis of the rotating member deteriorates the damping performance, it is preferable in terms of NV performance to make the control value related to the engine rotation speed higher depending on the hysteresis such that the vibration of the engine itself is reduced; however, the characteristic of the control value for the hysteresis is appropriately determined in consideration of required power performance, NV performance, fuel consumption, etc. For the characteristic of the control value with respect to the rotational characteristics such as the rigidity value and the hysteresis as described above, it is desirable to continuously change the control value depending on the rotational characteristics in accordance with a map, an arithmetic expression, etc.; however, the control value may be changed in two stages or three or more multiple stages. To avoid the resonance band, the control value related to the engine rotation speed can be made lower depending on the rigidity value and the hysteresis.

The characteristic correspondence control portion of the second aspect of the present invention is configured to make the control value related to the engine rotation speed higher, for example, when the detected rigidity value is high as compared to when the rigidity value is low, so that the resonance band can be avoided. The characteristic correspondence control portion of the third aspect of the present invention is configured to make the control value related to the engine rotation speed higher on condition that the resonance band can be avoided, for example, when the detected hysteresis is large as compared to when the hysteresis is small.

In the fourth aspect of the present invention, if the second electric motor having a torque near zero is dragged and rotated by the engine when the engine is used as the drive power source for running, the engine rotation speed defined as the control value is set depending on the rigidity value and the hysteresis so as to suppress a rattling sound generated at a gear meshing portion etc. by dragging of the second electric motor due to oscillation in engine rotation, and also if an electric motor coupled to the engine across the rotating member is dragged and rotated by the engine when the electric motor has a torque near zero during idling etc. of the engine, a rattling sound may be generated at a gear meshing portion etc. Therefore, if the electric motor having a torque near zero is dragged and rotated by the engine at the time of actuation (operation) of the engine, the engine rotation speed defined as the control value may be set depending on the rotational characteristics such as the rigidity value so as to suppress the rattling sound.

The present invention is suitably applied to, for example, a hybrid vehicle that includes a differential mechanism distributing the output of the engine to the electric motor and the driving wheel side and a damper device disposed as the rotating member between the engine and the differential mechanism and that can use the engine as the drive power source for running through the torque control of the electric motor and is also applicable to a series hybrid vehicle in which the engine is exclusively used for rotationally driving an electric generator to generate electricity. In such a hybrid vehicle, for example, a second electric motor usable as a drive power source is disposed as needed in a power transmission path between the differential mechanism and the driving wheels or at another power transmission position.

Example

An example of the present invention will now be described in detail below with reference to the drawings.

FIG. 1 is a skeleton diagram for explaining a drive system of a hybrid vehicle 10 to which the present invention is applied, showing main portions of the control system together. The hybrid vehicle 10 has, for example, a transversely-mounted drive system of an FF (front-engine front-wheel drive) type etc. and includes in a power transmission path between an engine 12 and a pair of left and right driving wheels 14, a first drive portion 16, a second drive portion 18, a final reduction gear 20, a pair of left and right axles 22, etc. The engine 12 is an internal combustion engine such as a gasoline engine and a diesel engine and has a crankshaft 24 to which a damper device 26 absorbing a torque fluctuation is coupled. The damper device 26 includes a first rotating element 26a coupled to the crankshaft 24 and a second rotating element 26b coupled via an input shaft 28 to a differential mechanism 30 with multiple types of springs 32 and a friction mechanism 34 interposed between the first rotating element 26a and the second rotating element 26b, so that a rigidity value (spring constant) corresponding to a rate of a change in input torque Tin to a change in twist angle Φ is changed stepwise while a predetermined hysteresis characteristic is provided between when the twist angle Φ increases and when the twist angle Φ decreases. A torque limiter 35 is disposed on an outer circumferential end portion of the damper device 26. The damper device 26 corresponds to a rotating member having rotational characteristics related to the input torque Tin, and the first rotating element 26a corresponds to a coupling portion of the damper device 26 on the engine 12 side.

The crankshaft 24 integrally coupled to the first rotating element 26a is coupled to a housing 38 via a meshing brake 36 so that rotation is prevented. The meshing brake 36 has meshing teeth 24a disposed on the crankshaft 24, meshing teeth 38a disposed on the housing 38, and a meshing sleeve 36a having an inner circumferential surface provided with meshing teeth capable of meshing simultaneously with both the meshing teeth 24a, 38a, and the meshing sleeve 36a is moved in an axial direction so that the crankshaft 24 is switched between a state in which the crankshaft 24 is relatively non-rotatably engaged with the housing 38 and a state in which the crankshaft 24 is released from the housing 38 and made freely rotatable. For example, an electromagnetic switching valve etc. disposed in a hydraulic control circuit 58 is switched in accordance with a hydraulic control signal Sac supplied from an electronic control device 90, so that the meshing sleeve 36a is moved in the axial direction via a hydraulic cylinder etc. to engage and release the meshing brake 36. Alternatively, the meshing sleeve 36a can be moved in the axial direction by using another drive device such as an electric feed screw mechanism. The meshing brake 36 is provided with a synchronizing mechanism of a cone type etc. as needed. The meshing brake 36 corresponds to a rotation lock mechanism, and instead of the meshing brake 36, a friction brake or a one-way clutch which prevents the engine 12 from rotating in only the reverse rotation direction can be employed as the rotation lock mechanism. An engine connecting/disconnecting clutch capable of enabling/disenabling power transmission can be disposed between the engine 12 and the meshing teeth 24*a*.

The first drive portion 16 is configured to include a first motor generator MG1 and an output gear 40 in addition to the engine 12, the differential mechanism 30, and the meshing brake 36. The differential mechanism 30 is a single pinion type planetary gear device and includes a sun gear S, a ring gear R, and a carrier CA as three rotating elements in a differentially rotatable manner; the first motor generator MG1 is coupled to the sun gear S; the input shaft 28 is coupled to the carrier CA; and the output gear 40 is coupled to the ring gear R. Therefore, a torque transmitted from the engine 12 via the damper device 26 to the carrier CA of the differential mechanism 30 is distributed by the differential mechanism 30 to the first motor generator MG1 and the output gear 40, and when a rotation speed (MG1 rotation speed) Nmg1 of the first motor generator MG1 is controlled through regenerative control etc., a rotation speed (engine rotation speed) Ne of the engine 12 is continuously variably changed and output from the output gear 40. Therefore, the differential mechanism 30 and the first motor generator MG1 function as an electric continuously variable transmission. The first motor generator MG1 alternatively functions as an electric motor or an electric generator and is connected through an inverter 60 to an electric storage device 62 such as a battery.

On the other hand, when the first motor generator MG1 is rotationally driven in a negative rotation direction opposite to a running direction of the engine 12 while the rotation of the crankshaft 24 is prevented by the meshing brake 36, i.e., while a rotation of the carrier CA is prevented via the damper device 26, a torque is applied to the output gear 40 in the positive rotation direction (vehicle forward direction) same as the running direction of the engine 12 due to a reaction force generated by the meshing brake 36, and the output gear 40 is rotationally driven in the positive rotation direction. When the first motor generator MG1 is rotationally driven in the positive rotation direction same as the running direction of the engine 12, a torque is applied to the output gear 40 in the reverse rotation direction (vehicle reverse direction) opposite to the running direction of the engine 12 due to a reaction force generated by the meshing brake 36, and the output gear 40 is rotationally driven in the reverse rotation direction. In such a case, a torque of the first motor generator MG1 is amplified depending on a gear ratio ρ of the differential mechanism 30 and applied to the damper device 26 coupled to the carrier CA. The first motor generator MG1 is an electric motor capable of applying a torque to the damper device 26 via the differential mechanism 30.

Figure 2:
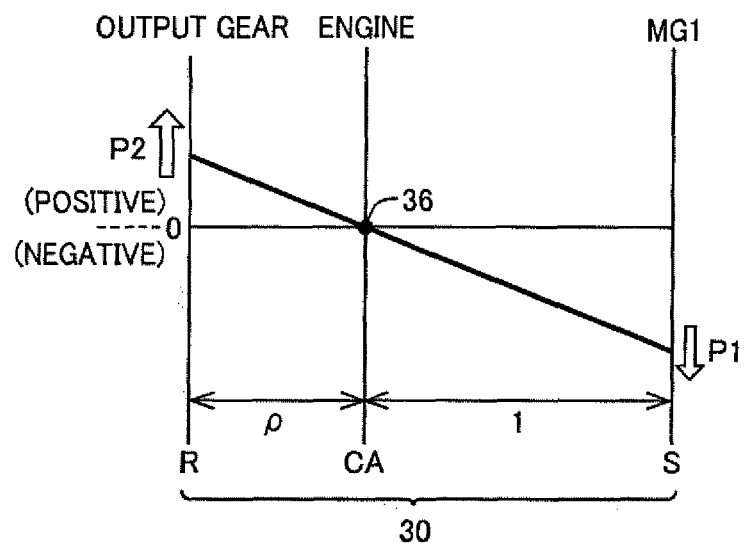
FIG. 2 is an example of a collinear chart of a differential mechanism of the hybrid vehicle of FIG. 1.

FIG. 2 is a collinear chart in which the three rotating elements of the differential mechanism 30, i.e., the sun gear S, the ring gear R, and the carrier CA, can be connected by a straight line in terms of rotation speed; the upward direction of FIG. 2 is the running direction of the engine 12, i.e., the positive rotation direction; and intervals among the vertical axes are determined depending on the gear ratio ρ (=the number of teeth of the sun gear S/the number of teeth of the ring gear R) of the differential mechanism 30. For example, describing a case that the output gear 40 is rotationally driven in the vehicle forward direction by the first motor generator MG1, a torque of rotation in the negative rotation direction (the downward direction of FIG. 2) opposite to the running direction of the engine 12 is applied to the sun gear S as indicated by an arrow P1 through a power running control of the first motor generator MG1 while the rotation of the carrier CA is prevented by the meshing brake 36, and when the sun gear S is rotationally driven in the negative rotation direction, a torque of rotation in the positive rotation direction (the upward direction of FIG. 2) same as the running direction of the engine 12 is applied as indicated by an arrow P2 to the ring gear R to which the output gear 40 is coupled, so that a drive power is obtained in the forward direction.

Returning to FIG. 1, the output gear 40 is meshed with a large diameter gear 44 disposed on an intermediate shaft 42 parallel to the input shaft 28. A dog clutch 43 is disposed between the large diameter gear 44 and the intermediate shaft 42 so that a power transmission is selectively switched between to be enabled and disenabled. This dog clutch 43 is configured in the same way as the meshing brake 36 and has an engaged state and a disengaged state switched therebetween via a hydraulic cylinder etc. when another electromagnetic switching valve etc. disposed in the hydraulic control circuit 58 is switched in accordance with the hydraulic control signal Sac supplied from the electronic control device 90, so that the power transmission is enabled and disenabled between the large diameter gear 44 and the intermediate shaft 42. A small diameter gear 46 smaller in diameter than the large diameter gear 44 is disposed on the intermediate shaft 42, and the small diameter gear 46 is meshed with a differential ring gear 48 of the final reduction gear 20. Therefore, the rotation of the output gear 40 is reduced in speed depending on a ratio of the numbers of teeth between the output gear 40 and the large diameter gear 44 and a ratio of the numbers of teeth between the small diameter gear 46 and the differential ring gear 48 and transmitted to the final reduction gear 20 and is further transmitted from the pair of the axles 22 to the driving wheels 14 through a differential gear mechanism of the final reduction gear 20. A parking gear 45 is relatively non-rotatably disposed on the intermediate shaft 42, and when a parking range is selected by operation of a shift lever to a P position for parking etc., a parking lock pawl not shown is pressed against and meshed with the parking gear 45 in accordance with an urging force of a spring etc. so as to prevent rotation of members on the driving wheel 14 side from the intermediate shaft 42.

The second drive portion 18 is configured to include a second motor generator MG2 and a motor output gear 52 disposed on a motor shaft 50 of the second motor generator MG2, and the motor output gear 52 is meshed with the large diameter gear 44. Therefore, a rotation speed (MG2 rotation speed Nmg2) of the second motor generator MG2 is reduced depending on a ratio of the number of teeth between the motor output gear 52 and the large diameter gear 44 and a ratio of the number of teeth between the small diameter gear 46 and the differential ring gear 48 and transmitted to the final reduction gear 20 to rotationally drive the driving wheels 14 via the pair of the axles 22. The second motor generator MG2 alternatively functions as an electric motor and an electric generator and is connected through the inverter 60 to the electric storage device 62. The second motor generator MG2 corresponds to a second electric motor usable as a drive power source.

The hybrid vehicle 10 also includes an automatic brake system 66. The automatic brake system 66 electrically controls a brake force i.e. a brake hydraulic pressure, of each of wheel brakes 67 disposed on the driving wheels 14 and driven wheels (non-driving wheels) not shown in accordance with a brake control signal Sb supplied from the electronic control device 90. The wheel brake 67 is also supplied with a brake hydraulic pressure via a brake master cylinder when a brake pedal not shown is depressed, so that a brake force is mechanically generated depending on the brake hydraulic pressure, i.e., a brake operating force.

The hybrid vehicle 10 having the drive system configured as described above includes the electronic control device 90 as a controller providing various controls such as an output control of the engine 12, a torque control of the motor generators MG1, MG2, an engagement/release control of the meshing brake 36 and the dog clutch 43, a control of automatic braking by the automatic brake system 66. The electronic control device 90 includes a so-called microcomputer having a CPU, a RAM, a ROM, an input/output interface, etc. and executes a signal process according to a program stored in advance in the ROM, while utilizing a temporary storage function of the RAM to provide the various controls. The electronic control device 90 is supplied with signals indicative of various pieces of information required for control such as the engine rotation speed Ne, a vehicle speed V, the MG1 rotation speed Nmg1, the MG2 rotation speed Nmg2, an accelerator operation amount (accelerator pedal depression operation amount) Acc, a shift lever operation position Psh, and an electric storage remaining amount SOC of the electric storage device 62, from an engine rotation speed sensor 70, a vehicle speed sensor 72, an MG1 rotation speed sensor 74, an MG2 rotation speed sensor 76, an accelerator operation amount sensor 78, a shift position sensor 80, and an SOC sensor 64, respectively, for example. Examples of the shift lever operation position Psh include a D position for forward running, an R position for reverse running, the P position for parking, and an N position for neutral, and when the parking range is selected by operation to the P position, the parking lock pawl is meshed with the parking gear 45 disposed on the intermediate shaft 42 so that rotation of the parking gear 45 is mechanically prevented. The electronic control device 90 outputs, for example, an engine control signal Se for controlling an engine output through an electronic throttle valve, a fuel injection device, an ignition device, etc. of the engine 12, a motor control signal Sm for controlling torques (power running torque and regenerative torque) of the motor generators MG1 and MG2, the hydraulic control signal Sac switching the meshing brake 36 and the dog clutch 43 between engaged and disengaged states via the electromagnetic switching valve etc. of the hydraulic control circuit 58, and the brake control signal Sb controlling the brake force of the wheel brake 67 via the automatic brake system 66.

Figure 3:
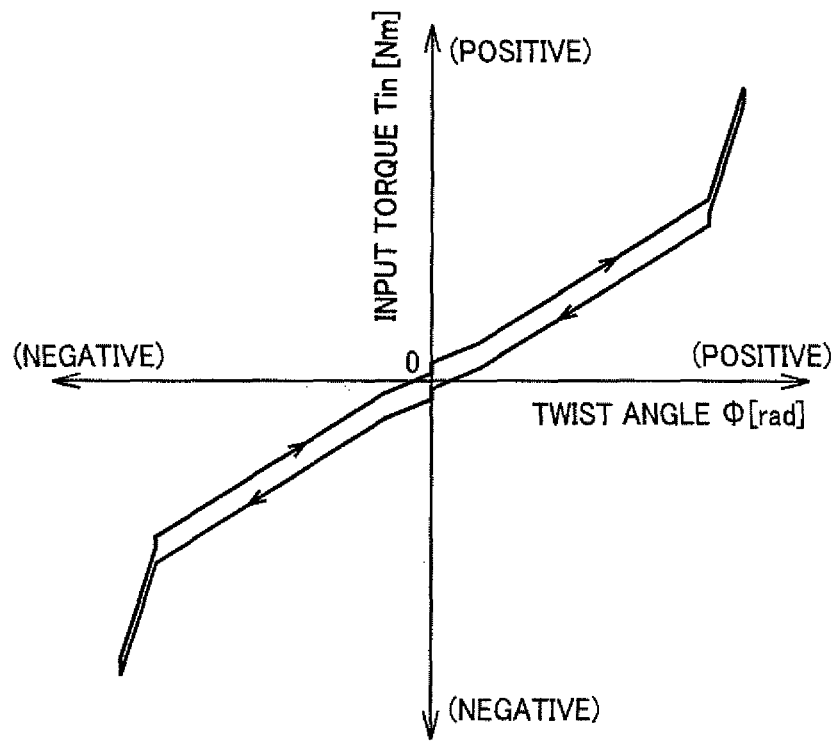
FIG. 3 is a diagram of an example of a relationship between an input torque Tin and a twist angle Φ of a damper device of FIG. 1.
Figure 4:
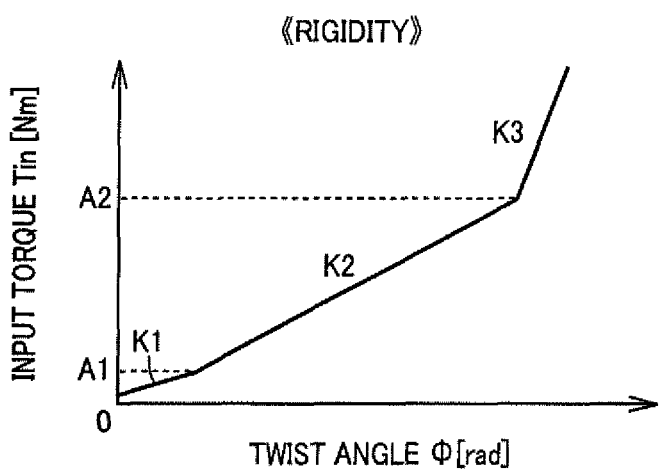
FIG. 4 is a view illustrating rigidity values K1, K2, K3 obtained from the relationship of FIG. 3.
Figure 5:
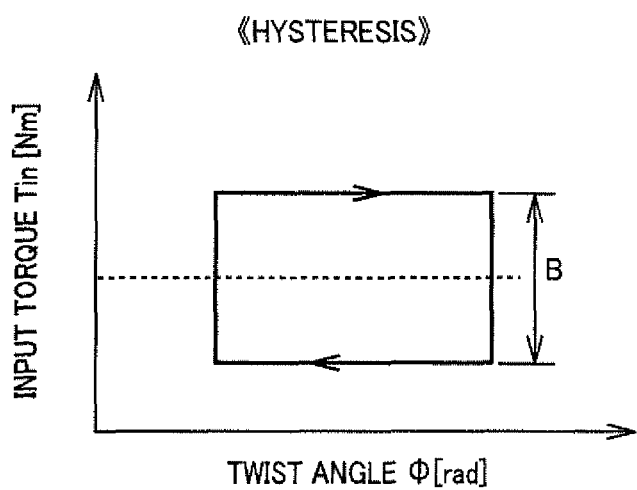
FIG. 5 is a diagram illustrating a hysteresis B obtained from the relationship of FIG. 3.

The electronic control device 90 corresponds to a vehicle control device and functionally includes a characteristic correspondence control portion 92, a characteristic storage portion 94, and a characteristic learning portion 96 and provides various controls for improving power performance, NV performance, fuel consumption, etc. based on rotational characteristics of the damper device 26, i.e., a rigidity and a hysteresis. The damper device 26 has a relationship between the input torque Tin and the twist angle Φ, for example, as shown in FIG. 3, due to the action of the springs 32 and the friction mechanism 34 etc. Although FIG. 3 shows a symmetric change with respect to an origin O, the damper device 26 causing an asymmetric change is also employable. From the relationship between the input torque Tin and the twist angle Φ, the rotational characteristics related to the rigidity and the hysteresis can be identified as shown in FIGS. 4 and 5. The rigidity is a change characteristic of the input torque Tin with respect to the twist angle Φ and has three kinds K1, K2, K3 of a rigidity value corresponding to a rate of a change ΔTin of the input torque Tin to a change ΔΦ of the twist angle Φ, i.e., ΔTin/ΔΦ, and the rigidity value changes at two change points A1, A2 different in the input torque Tin. Therefore, the rigidity value is K1 in a region of the input torque Tin equal to or less than A1, the rigidity value is K2 in a region from A1 to A2, and the rigidity value is K3 in a region greater than A2. The hysteresis of FIG. 5 is a deviation of the input torque Tin when the twist angle Φ increases and decreases and is obtained by offsetting an amount corresponding to the rigidity and extracting only the deviation, and an amount corresponding to a dimension B is the hysteresis.

The rotational characteristics of the damper device 26, i.e., the rigidity values K1 to K3 and the change points A1, A2 related to the rigidity as well as the hysteresis B, may vary due to individual differences of the damper device 26, i.e., dimensional errors of component parts and variations in spring constant of the springs 32, variations in friction coefficient of friction material of the friction mechanism 34, etc., and may change due to a temporal change. If these rotational characteristics vary or change, even a predetermined control provided by the characteristic correspondence control portion 92 based on the rotational characteristics may not produce a desired effect. Therefore, the characteristic learning portion 96 is provided in this example to detect these rotational characteristics and to make a correction or an update (learning) of a value of the rotational characteristics (characteristic value) stored in the characteristic storage portion 94.

Figure 6:
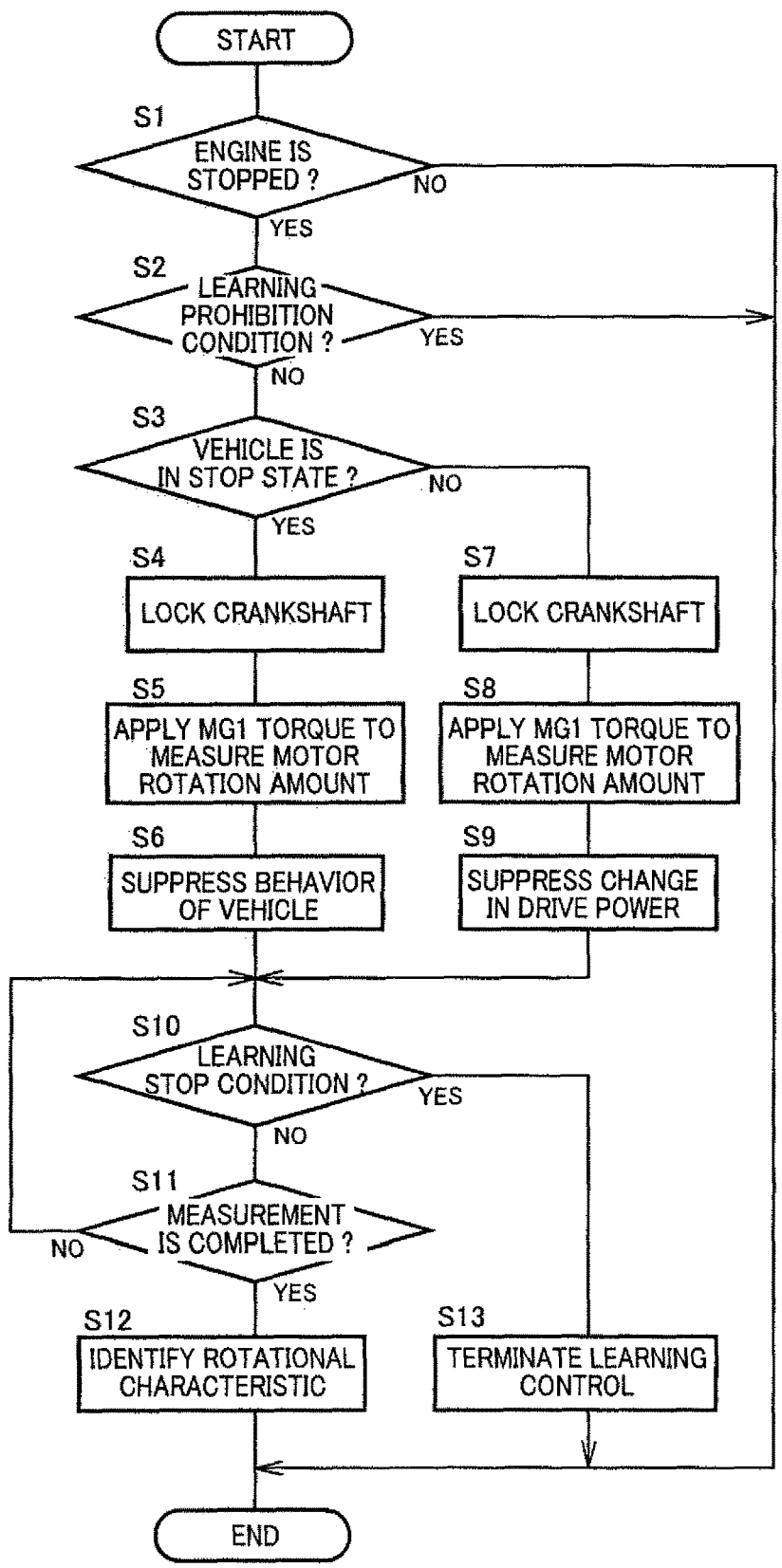
FIG. 6 is a flowchart specifically explaining a signal process executed by a characteristic learning portion of FIG. 1.

The characteristic leaning portion 96 provides a learning control in accordance with steps S1 to S13 (hereinafter simply referred to as S1 to S13; steps are omitted also in the other flowcharts) of a flowchart of FIG. 6. This learning control is periodically provided under certain conditions determined based on a running distance or a running time of the hybrid vehicle 10 in this example. At S1, it is determined whether the engine 12 is stopped, and if the engine 12 is in a stop state, S2 is executed, or if the engine 12 is in operation, the control is terminated. At S2, it is determined whether a predefined learning prohibition condition is satisfied. For the learning prohibition condition, for example, (a) and (b) are defined as follows.
(a) The electric storage remaining amount SOC of the electric storage device 62 is equal to or less than a lower limit value defined in advance for ensuring restarting of the engine 12 etc.
(b) An engine start request is made (an air conditioning request, a driver's accelerator operation, etc.).

Figure 7:
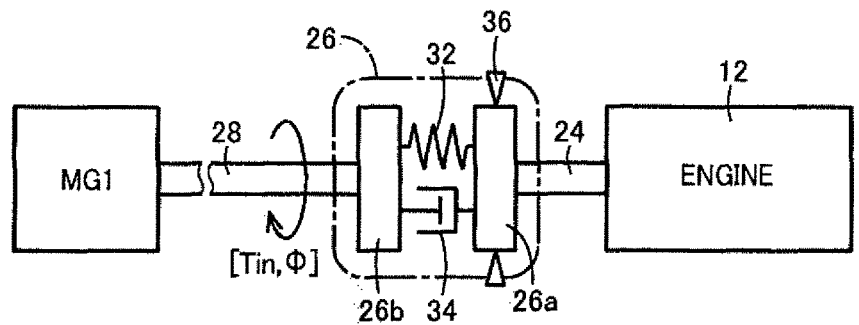
FIG. 7 is a diagram of a principle of measuring the twist angle Φ while changing the input torque Tin of the damper device at steps S4, S5 of FIG. 6.

If any one of the learning prohibition conditions is satisfied, the control is terminated, and if none is satisfied, learning is possible, so that S3 and subsequent steps are executed. At S3, it is determined whether the hybrid vehicle 10 is in a stop state, i.e., whether the vehicle speed V is 0, and if the vehicle 10 is in the stop state, S4 and subsequent steps are executed. At S4, the meshing brake 36 is engaged to lock the crankshaft 24 in a non-rotatable manner, and at S5, the first motor generator MG1 is subjected to the power running control so that the torque (the input torque Tin) is applied to the damper device 26 to measure the twist angle m. FIG. 7 is a diagram for explaining a principle of applying the input torque Tin and measuring the twist angle Φ in this way, and the relationship as shown in FIG. 3 can be obtained by providing the power running control of the first motor generator MG1 to apply the torque (the input torque Tin) to the damper device 26 via the differential mechanism 30 while the meshing brake 36 is engaged to lock the crankshaft 24. Specifically, by measuring the MG1 rotation speed Nmg1 with the MG1 rotation speed sensor 74 such as a resolver while continuously increasing and decreasing the torque of the first motor generator MG1, the relationship between the input torque Tin and the twist angle Φ as shown in FIG. 3 can be obtained. Based on the gear ratio ρ of the differential mechanism 30, the input torque Tin can be calculated from the motor torque of the first motor generator MG1, and the twist angle Φ can be calculated from the MG1 rotation speed Nmg1. Since the relationship between the input torque Tin and the twist angle Φ of the damper device 26 of this example symmetrically changes with respect to the origin O as shown in FIG. 3, only one of the positive and negative regions may be measured. If a one-way clutch is disposed instead of the meshing brake 36 to prevent the rotation of the engine 12 only in the reverse rotation direction, the twist angle Φ may be measured such that the torque in the reverse rotation direction is applied as the input torque Tin.

S6 is executed concurrently with the execution of S5 to suppress the behavior of the vehicle 10 such that the vehicle 10 is retained in the stop state regardless of the power running control of the first motor generator MG1. Specifically, when a torque is applied to the damper device 26 by providing the power running control of the first motor generator MG1, a torque is transmitted to the output gear 40 due to a reaction force thereof so that a drive power is generated, and therefore, the behavior of the vehicle 10 caused by the drive power is restrained. More specifically, for example, if the parking range is selected and the parking lock pawl is urged to mesh with the parking gear 45, the second motor generator MG2 is subjected to the power running control to slightly rotate the intermediate shaft 42, and the parking lock pawl is thereby reliably meshed with the parking gear 45. For another means, a brake force may be generated in the wheel brake 67 by the automatic brake system 66. Alternatively, the dog clutch 43 is released to interrupt the power transmission toward the driving wheel 14 while a torque of the second motor generator MG2 is controlled to prevent the rotation of the output gear 40 so that a predetermined input torque Tin is applied to the damper device 26. In other words, the torque of the second motor generator MG2 is controlled to offset the drive power generated by the power running control of the first motor generator MG1, and this control can be provided even while the dog clutch 43 is engaged and is also applicable to a vehicle without the dog clutch 43. When the parking range is selected, the parking lock pawl is engaged with the parking gear 45 to prevent the rotation of the driving wheels 14, so that the vehicle behavior restraining control of S6 may be omitted.

When the determination of S3 is NO (negative), i.e., when the vehicle 10 is running rather than being in the stop state, S7 to S9 are executed to obtain the relationship between the input torque Tin and the twist angle Φ. Specifically, at S7 and S8, as in S4 and S5, while the crankshaft 24 is non-rotatably locked by the meshing brake 36, the first motor generator MG1 is subjected to the power running control so that the torque (the input torque Tin) is applied to the damper device 26 to measure the twist angle Φ. In this case, as shown in FIG. 2, the output gear 40 is rotated depending on the vehicle speed V, and the first motor generator MG1 is further rotated in the reverse rotation direction, so that the twist angle Φ is calculated by subtracting an amount corresponding to the rotation speed of the first motor generator MG1. During running in two-motor drive mode in which the first motor generator MG1 is also used as a drive power source, the two-motor drive is once switched to single-motor drive in which only the second motor generator MG2 is used as the drive power source, and the twist angle Φ can thereby be measured with the MG1 rotation speed sensor 74 such as a resolver while continuously increasing and decreasing the torque of the first motor generator MG1. At S9, the torque of the second motor generator MG2 is controlled to increase or decrease so as to offset the drive power generated by the power running control of the first motor generator MG1, and a change in drive power of the vehicle 10 is thereby suppressed. When the hybrid vehicle 10 is coasting, the dog clutch 43 may be released to interrupt the power transmission toward the driving wheels 14, and the torque of the second motor generator MG2 may be controlled to offset the drive power generated by the power running control of the first motor generator MG1. Even during running with a predetermined drive power, similarly, while the dog clutch 43 is released to interrupt the power transmission toward the driving wheels 14, the torque of the second motor generator MG2 may be controlled to offset the drive power generated by the power running control of the first motor generator MG1.

At S10 following S6 or S9, it is determined whether a predefined learning stop condition is satisfied. For the learning stop condition, for example, (a) to (g) are defined as follows.

(a) The electric storage remaining amount SOC of the electric storage device 62 is equal to or less than a lower limit value defined in advance for ensuring the startability of the engine 12 etc.

(b) An engine start request is made (an air conditioning request, a driver's accelerator operation, etc.).

(c) The vehicle is in a condition causing resonance (a surging torque input to tires, an uneven road, etc.).

(d) The drive power becomes insufficient (a slope, a high drive power, etc.).

(e) A motor torque must be generated for other requirements (a motor torque for eliminating a backlash or starting an engine, etc.).

(f) The motor is in a low rotation speed region (i.e., the vehicle is in a low vehicle speed region) in which a motor cogging torque is large.

(g) The vehicle is moving at the time of measurement for the vehicle stop state.

If any one of the learning stop conditions is satisfied, the learning control is stopped and terminated at S13, and if none is satisfied, S11 is executed. At S11, it is determined whether a series of measurements according to execution of S5 or S8 is completed, and S10 is repeatedly executed until the series of measurements are completed. If the series of measurements are completed without satisfying the learning stop condition of S10, the determination at S11 is YES (affirmative), and S12 is executed to identify and store (overwrite) the rotational characteristics of the damper device 26 in the characteristic storage portion 94. Specifically, from the relationship between the input torque Tin and the twist angle Φ as shown in FIG. 3 obtained by executing S5 or S8, the rigidity values K1 to K3 and the change points A1, A2 shown in FIG. 4 are extracted, or the hysteresis B shown in FIG. 5 is extracted, and these characteristic values are stored in the characteristic storage portion 94. As a result, the characteristic correspondence control portion 92 can provide various controls based on the new characteristic values stored in the characteristic storage portion 94.

Depending on at least one characteristic value of the rigidity values K1 to K3 and the change points A1, A2 related to the rigidity and the hysteresis B of the damper device 26 stored in the characteristic storage portion 94, the characteristic correspondence control portion 92 provides various controls so as to ensure predetermined power performance, NV performance, fuel consumption etc. of the vehicle 10. More specifically, the characteristic correspondence control portion 92 functionally includes an engine running control portion 100, an idle rotation control portion 102, an engine start control portion 104, and an engine stop control portion 106 to provide various respective controls related to the engine rotation speed Ne depending on the rotational characteristics of the damper device 26.

Figure 8:
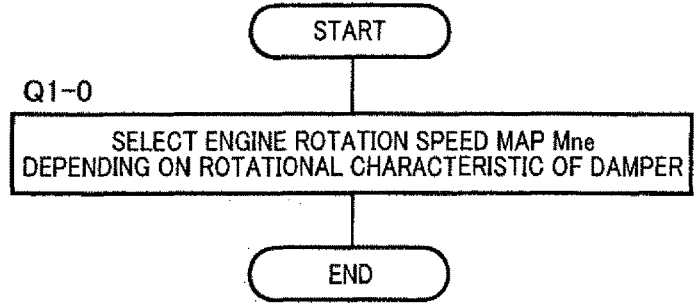
FIG. 8 is a diagram for explaining a signal process when an engine running control portion of FIG. 1 selects an engine rotation speed map Mne depending on rotational characteristics of the damper device.
Figure 9:
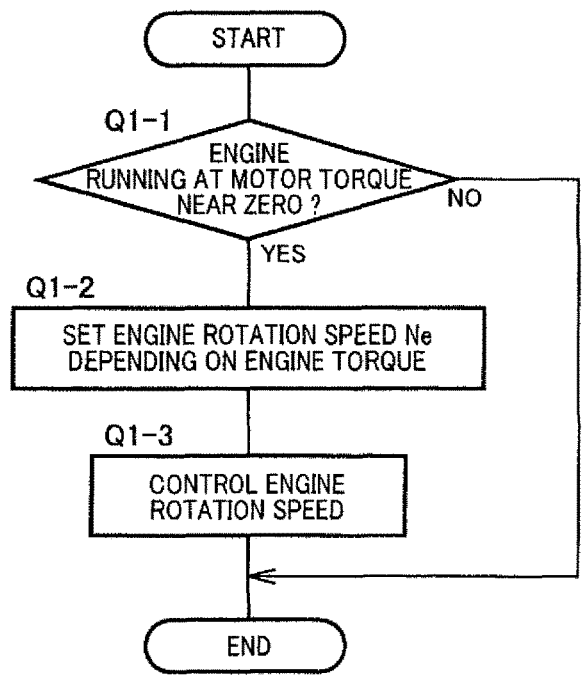
FIG. 9 is a flowchart for explaining an engine rotation speed control provided when the engine running control portion of FIG. 1 performs engine running while an MG2 torque is substantially zero.
Figure 10:
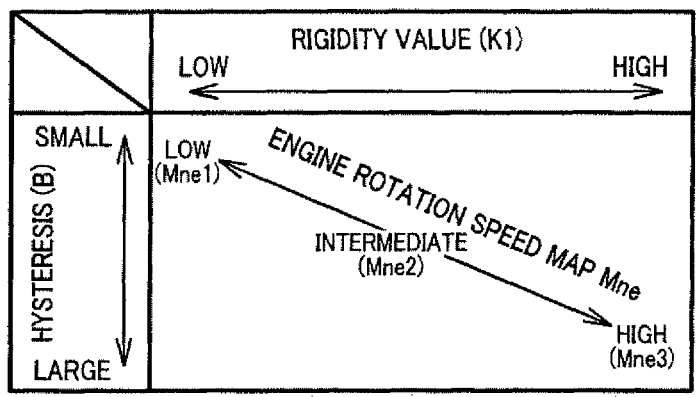
FIG. 10 is a diagram for explaining an example of a map used when the engine rotation speed map Mne is selected at step Q1-0 of FIG. 8.
Figure 11:
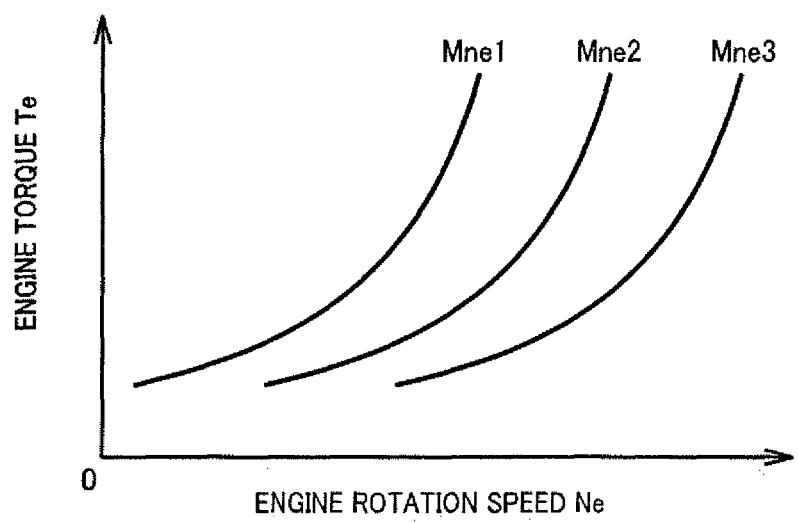
FIG. 11 is a diagram for explaining a specific example of the engine rotation speed map Mne of FIG. 10.

The engine running control portion 100 executes a signal process in accordance with Q1-0 to Q1-3 of FIGS. 8 and 9 during engine running while at least the engine 12 is used as a drive power source. Q1-0 of FIG. 8 is executed at a predetermined timing defined in advance such as when the engine 12 is started, and the rigidity value K1 and the hysteresis B of the damper device 26 are read from the characteristic storage portion 94 to select an engine rotation speed map Mne based on a map shown in FIG. 10 defined in advance by using the rigidity value K1 and the hysteresis B as parameters. FIG. 11 is an example of the engine rotation speed map Mne and is a diagram for explaining a relationship of three maps Mne1, Mne2, Mne3 shown in parentheses in FIG. 10. The engine rotation speed maps Mne1, Mne2, Mne3 are maps for setting the engine rotation speed Ne, which is the control value, depending on a required engine torque Te and are set such that the engine rotation speed Ne is set higher from Mne1 to Mne3 even at the same required engine torque Te. Therefore, as is apparent from FIG. 10, the map Mne is selected for setting the engine rotation speed Ne higher with respect to the required engine torque Te as the rigidity value K1 becomes higher and the hysteresis B becomes larger.

At Q1-1 of FIG. 9, it is determined whether a torque (MG2 torque) Tmg2 of the second motor generator MG2 is near zero in the engine running, and if Tmg2 is near zero (Tmg2≈0) is not satisfied, the process is terminated to provide a normal engine rotation speed control, or if Tmg2≈0 is satisfied, Q1-2 and the subsequent steps are executed. At Q1-2, the engine rotation speed Ne is set depending on the required engine torque Te in accordance with the engine rotation speed map Mne selected at Q1-0, and at Q1-3, the engine 12 and the first motor generator MG1 are controlled to achieve the set engine rotation speed Ne.

As described above, when the second motor generator MG2 having the MG2 torque Tmg2 near zero is dragged and rotated while the engine 12 is used as the drive power source for running, the engine rotation speed Ne is controlled depending on the rigidity value K1 and the hysteresis B of the damper device 26 such that the engine rotation speed Ne becomes higher as the rigidity value K1 becomes higher and that the engine rotation speed Ne becomes higher as the hysteresis B becomes larger. Specifically, if the rigidity value K1 of the damper device 26 is high or if the hysteresis B is large, the damper device 26 deteriorates in damping performance so that a larger rattling sound is generated by dragging of the motor output gear 52 etc. of the second motor generator MG2 by the engine 12 due to rotational vibration of the engine 12; however, since the engine rotation speed Ne is made higher, the rotational vibration of the engine 12 is reduced, and therefore, the occurrence of rattling sound is suppressed regardless of the deterioration in the damping performance so that a predetermined NV performance can be ensured. Although the NV performance can be more improved when the engine rotation speed Ne is higher, the engine rotation speed map Mne of FIG. 11 has an optimum value determined in consideration of power performance, fuel consumption, etc. while suppressing the occurrence of the rattling sound due to dragging of the motor output gear 52 etc. to ensure the predetermined NV performance, so that both the NV performance and the fuel consumption can be satisfied. Although the engine rotation speed map Mne is selected depending on the rigidity value K1 and the hysteresis B in this example, the rigidity value K2 or K3 may be used depending on the required engine torque Te. The engine rotation speed map Mne may be selected based on only one of the rigidity value K1 and the hysteresis B, and the engine rotation speed Ne defined as the control value may be set. Instead of the engine rotation speed map Mne, an arithmetic expression etc. may be used for calculating the engine rotation speed Ne depending on the engine torque Te.

Figure 12:
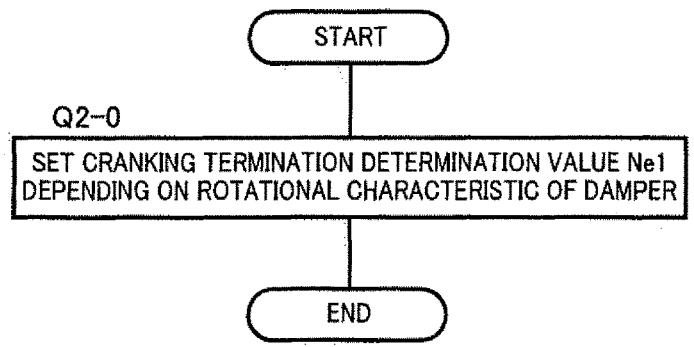
FIG. 12 is a diagram for explaining a signal process when an engine start control portion of FIG. 1 sets a cranking termination determination value Ne1 depending on the rotational characteristics of the damper device.
Figure 13:
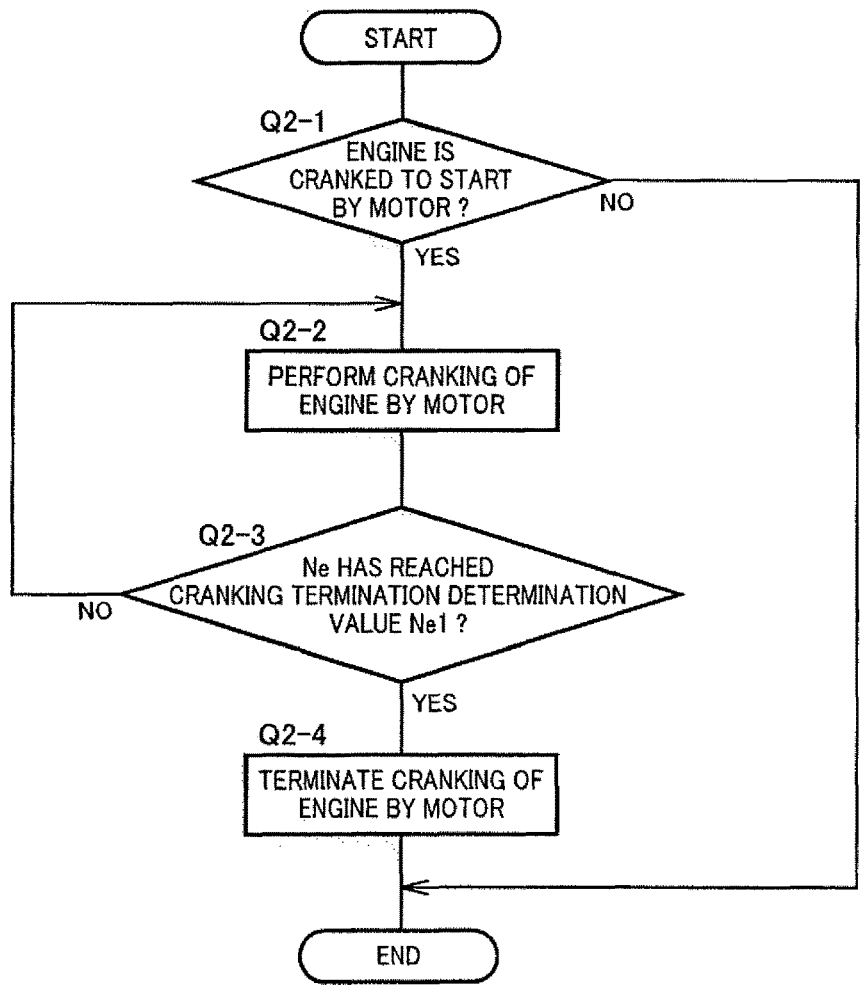
FIG. 13 is a flowchart for explaining an engine start control provided by the engine start control portion of FIG. 1.
Figure 14:
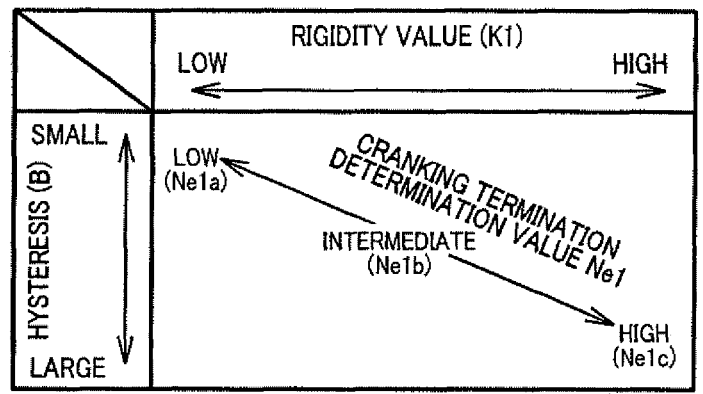
FIG. 14 is a diagram for explaining an example of a map used for setting the cranking termination determination value Ne1 at step Q2-0 of FIG. 12.

The engine start control portion 104 relates to an engine start control of cranking and starting the engine 12 via the differential mechanism 30 and the damper device 26 by the first motor generator MG1 and executes a signal process in accordance with Q2-0 to Q2-4 of FIGS. 12 and 13. Q2-0 of FIG. 12 is executed at a predetermined timing defined in advance such as when the engine 12 is started, and the rigidity value K1 and the hysteresis B of the damper device 26 are read from the characteristic storage portion 94 to set a cranking termination determination value Ne1 in accordance with a map shown in FIG. 14 defied in advance by using the rigidity value K1 and the hysteresis B as parameters. The cranking termination determination value Ne1 is the engine rotation speed Ne at which cranking of the engine 12 by the first motor generator MG1 is terminated. The map of FIG. 14 is defined such that the cranking termination determination value Ne1 changes continuously or step-by-step to a higher rotation speed as the rigidity value K1 becomes higher and the hysteresis B becomes larger. Specifically, cranking termination determination values Ne1$a$, Ne1$b$, Ne1$c$ shown in parentheses in FIG. 14 have a relationship of Ne1$a$<Ne1$b$<Ne1$c$. The cranking termination determination value Ne1 corresponds to a control value related to the engine rotation speed Ne.

At Q2-1 of FIG. 13, it is determined whether a cranking command is supplied to crank and start the engine 12 by the first motor generator MG1, and if the cranking command is not supplied, the process is terminated, or if the cranking command is supplied, Q2-2 and the subsequent steps are executed. At Q2-2, the engine 12 is cranked by the first motor generator MG1. Specifically, if the hybrid vehicle 10 is in the stop state, the first motor generator MG1 is rotated by the power running torque in the positive rotation direction that is the running direction of the engine 12, and the engine 12 can thereby be rotated in the positive direction for cranking. If the hybrid vehicle 10 is in the running state, the first motor generator MG1 in the reverse rotation state is braked by applying a torque in the positive rotation direction through the regenerative control etc., and the engine 12 can thereby be rotated in the positive rotation direction for cranking. At Q2-3, it is determined whether the engine rotation speed Ne has reached the cranking termination determination value Ne1 set at Q2-0 due to the engine start control through cranking, ignition, fuel injection, etc., i.e., whether the engine rotation speed Ne has exceeded the cranking termination determination value Ne1. If the engine rotation speed Ne has reached the cranking termination determination value Ne1, Q2-4 is executed to terminate the cranking by the first motor generator MG1.

Figure 15:
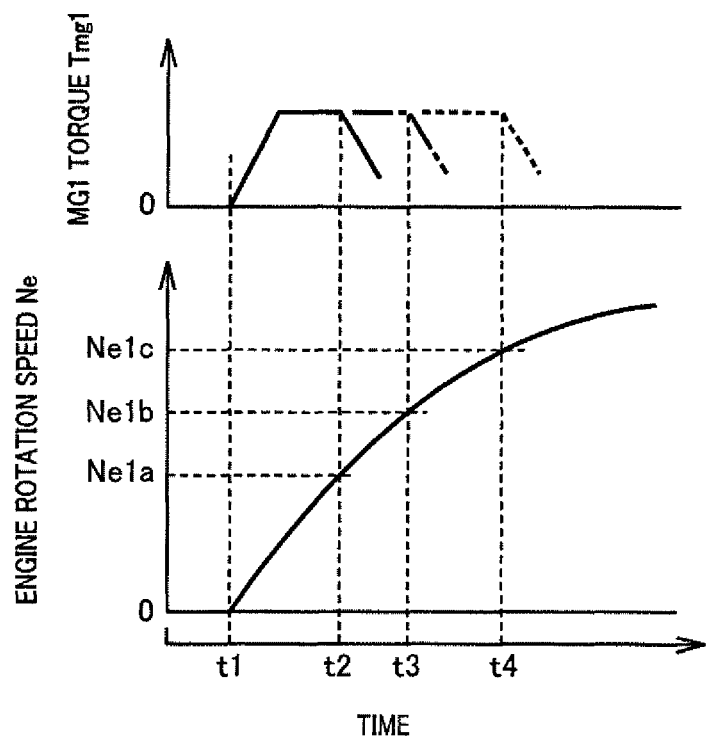
FIG. 15 is an example of a time chart for explaining changes in an MG1 torque (a cranking torque) etc. during the engine start control provided according to the flowchart of FIG. 13.

FIG. 15 is an example of a time chart when the engine start control is provided in accordance with the flowchart of FIG. 13, and time t1 is the time when the cranking of the engine 12 by the first motor generator MG1 is started in accordance with the cranking command. An MG1 torque Tmg1 in this case corresponds to a cranking torque. A solid line in a field of the MG1 torque Tmg1 shows a case where the cranking termination determination value Ne1$a$ of a low rotation speed is set at Q2-0, and the MG torque Tmg1 is reduced at time t2 when the engine rotation speed Ne reaches the cranking termination determination value Ne1$a$, so that the cranking is terminated. A dashed-dotted line in the field of the MG1 torque Tmg1 shows a case where the cranking termination determination value Ne1$b$ of an intermediate rotation speed is set at Q2-0, and the MG1 torque Tmg1 is reduced at time t3 when the engine rotation speed Ne reaches the cranking termination determination value Ne1$b$, so that the cranking is terminated. A broken line in the field of the MG1 torque Tmg1 shows a case where the cranking termination determination value Ne1$c$ of a high rotation speed is set at Q2-0, and the MG1 torque Tmg1 is reduced at time t4 when the engine rotation speed Ne reaches the cranking termination determination value Ne1$c$, so that the cranking is terminated. As a result, the engine rotation speed Ne is promptly increased to the cranking termination determination value Ne1 and is subsequently increased by self-rotation due to explosion to a predetermined target engine rotation speed such as an idle rotation speed.

As described above, when the engine 12 is cranked and started by the first motor generator MG1, the cranking termination determination value Ne1 is controlled depending on the rigidity value K1 and the hysteresis B of the damper device 26 such that the cranking termination determination value Ne1 becomes higher as the rigidity value K1 becomes higher and that the cranking termination determination value Ne1 becomes higher as the hysteresis B becomes larger. Thus, although the higher rigidity value K1 of the damper device 26 makes the resonance band higher and the larger hysteresis B deteriorates the damping performance, the cranking termination determination value Ne1 is made higher, and therefore, the engine rotation speed Ne can quickly be increased by cranking of the engine 12 to a higher rotation speed than the resonance band, so that the NV performance can be prevented from deteriorating due to resonance. Although the resonance is more suppressed so that the NV performance is more improved when the cranking termination determination value Ne1 is higher, a cranking termination determination value map shown in FIG. 14 has an optimum value determined such that, for example, the engine rotation speed Ne promptly passes through the resonance band as long as the engine 12 can rotate in a self-sustaining manner so as to minimize a cranking time (power consumption amount) of the first motor generator MG1 while the predetermined NV performance is ensured. Although the cranking termination determination value map of FIG. 14 is defined based on the rigidity value K1 and the hysteresis B in this example, the cranking termination determination value map may be defined based on only one of the rigidity value K1 and the hysteresis B. Instead of the cranking termination determination value map, an arithmetic expression etc. may be used for calculating the cranking termination determination value Ne1 by using the rigidity value K1 or the hysteresis B as a parameter.

Figure 16:
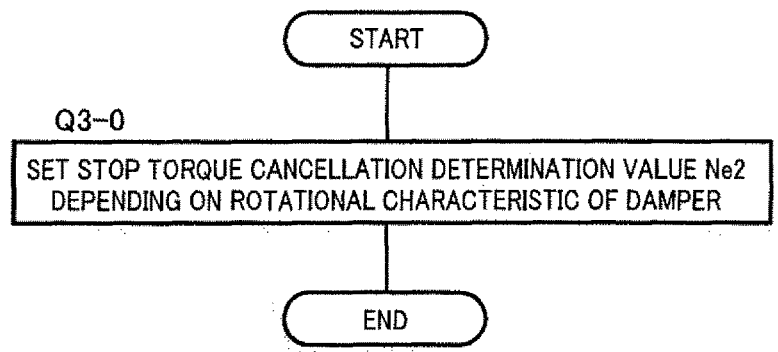
FIG. 16 is a diagram for explaining a signal process when an engine stop control portion of FIG. 1 sets a stop torque cancellation determination value Ne2 depending on rotational characteristics of the damper device.
Figure 17:
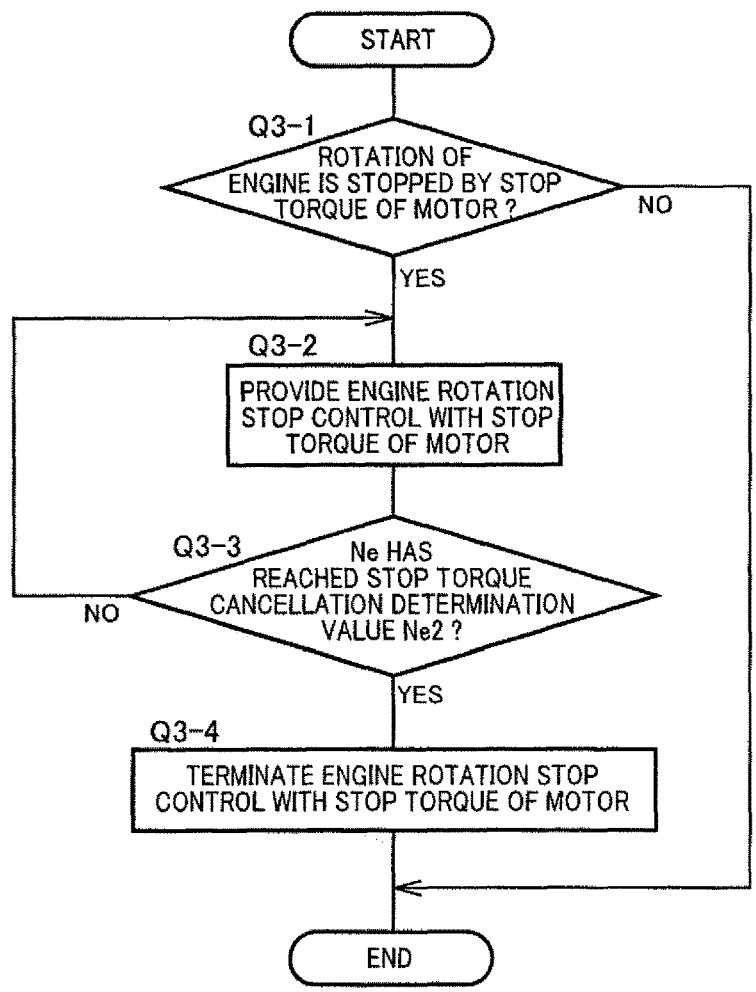
FIG. 17 is a flowchart for explaining an engine rotation stop control provided by the engine stop control portion of FIG. 1.
Figure 18:
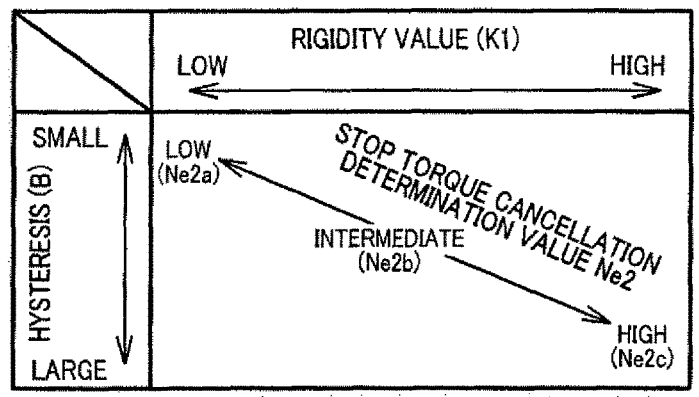
FIG. 18 is a diagram for explaining an example of a map used for setting the stop torque cancellation determination value Ne2 at step Q3-0 of FIG. 16.

The engine stop control portion 106 relates to a rotation stop control of applying a stop torque from the first motor generator MG1 via the differential mechanism 30 and the damper device 26 to the engine 12 to stop rotation at the time of operation stop of the engine 12 when fuel injection etc. are stopped and executes a signal process in accordance with Q3-0 to Q3-4 of FIGS. 16 and 17. Q3-0 of FIG. 16 is executed at a predetermined timing defined in advance such as when the engine 12 is stopped, and the rigidity value K1 and the hysteresis B of the damper device 26 are read from the characteristic storage portion 94 to set a stop torque cancellation determination value Ne2 in accordance with a map shown in FIG. 18 defined in advance by using the rigidity value K1 and the hysteresis B as parameters. The stop torque cancellation determination value Ne2 is an engine rotation speed Ne at which the stop torque from the first motor generator MG1 is canceled. The map of FIG. 18 is defined such that the stop torque cancellation determination value Ne2 changes continuously or step-by-step to a higher rotation speed as the rigidity value K1 becomes higher and the hysteresis B becomes larger. Specifically, stop torque cancellation determination values Ne2$a$, Ne2$b$, Ne2$c$ shown in parentheses in FIG. 18 have a relationship of Ne2$a$<Ne2$b$<Ne2$c$. This stop torque cancellation determination value Ne2 corresponds to the control value related to the engine rotation speed Ne.

At Q3-1 of FIG. 17, it is determined whether an engine rotation stop command is supplied to stop the rotation of the engine 12 with the stop torque from the first motor generator MG1, and if the engine rotation stop command is not supplied, the process is terminated, or if the engine rotation stop command is supplied, Q3-2 and the subsequent steps are executed. At Q3-2, the rotation stop control is provided by applying the stop torque from the first motor generator MG1 to the engine 12 to stop rotation. Specifically, through the power running control etc. causing the first motor generator MG1 to rotate in the negative rotation direction opposite to the running direction of the engine 12, the stop torque can be applied via the differential mechanism 30 and the damper device 26 to the crankshaft 24 to reduce the engine rotation speed Ne. At Q3-3, it is determined whether the engine rotation speed Ne reduced by the stop torque, a rotation resistance of the engine 12 itself etc. has reached the stop torque cancellation determination value Ne2 set at Q3-0, i.e., whether the engine rotation speed Ne is less than the stop torque cancellation determination value Ne2. If the engine rotation speed Ne has reached the stop torque cancellation determination value Ne2, Q3-4 is executed to terminate the engine rotation stop control with the stop torque of the first motor generator MG1. As a result, the engine rotation speed Ne is promptly reduced, and subsequently, the rotation is naturally stopped by the rotation resistance of the engine 12 itself due to a friction loss etc.

Figure 19:
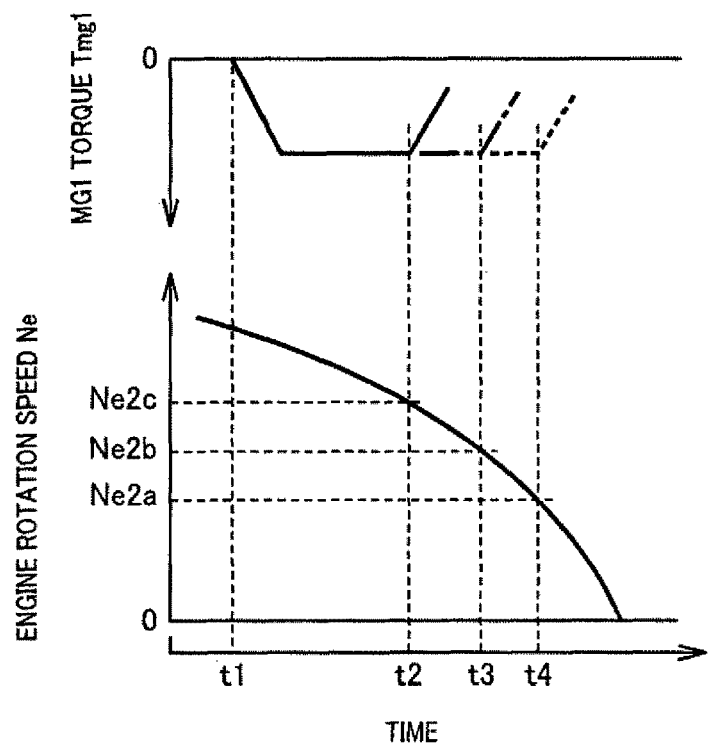
FIG. 19 is an example of a time chart for explaining changes in the MG1 torque (stop torque) etc. during the engine rotation stop control provided according to the flowchart of FIG. 17.

FIG. 19 is an example of a time chart when the engine rotation stop control is performed in accordance with the flowchart of FIG. 17, and time t1 is the time when the rotation stop control of the engine 12 is started with the stop torque from the first motor generator MG1 in accordance with the engine rotation stop command. The MG1 torque Tmg1 in this case corresponds to the stop torque for stopping the rotation of the engine 12. A solid line in a field of the MG1 torque Tmg1 shows a case where the stop torque cancellation determination value Ne2$c$ of a high rotation speed is set at Q3-0, and the MG1 torque Tmg1 is reduced at time t2 when the engine rotation speed Ne reaches the stop torque cancellation determination value Ne2$c$, so that the rotation stop control is terminated. A dashed-dotted line in the field of the MG1 torque Tmg1 shows a case where the stop torque cancellation determination value Ne2b of an intermediate rotation speed is set at Q3-0, and the MG1 torque Tmg1 is reduced at time t3 when the engine rotation speed Ne reaches the stop torque cancellation determination value Ne2b, so that the rotation stop control is terminated. A broken line in the field of the MG1 torque Tmg1 shows a case where the stop torque cancellation determination value Ne2a of a low rotation speed is set at Q3-0, and the MG1 torque Tmg1 is reduced at time t4 when the engine rotation speed Ne reaches the stop torque cancellation determination value Ne2a, so that the rotation stop control is terminated.

As described above, when the stop torque is applied by the first motor generator MG1 to the engine 12 to stop rotation, the stop torque cancellation determination value Ne2 is controlled depending on the rigidity value K1 and the hysteresis B of the damper device 26 such that the stop torque cancellation determination value Ne2 becomes higher as the rigidity value K1 becomes higher and that the stop torque cancellation determination value Ne2 becomes higher as the hysteresis B becomes larger. Thus, although the higher rigidity value K1 of the damper device 26 makes the resonance band higher and the larger hysteresis B deteriorates the damping performance, the stop torque cancellation determination value Ne2 is made higher, and therefore, the stop torque can be canceled as quickly as possible when the engine rotation speed Ne falls below the resonance band, so that the NV performance can be prevented from deteriorating due to abnormal noises etc. generated by reverse rotation of the engine 12 resulting from a delay in cancellation of the stop torque, while suppressing the resonance. The stop torque cancellation determination value map of FIG. 18 has an optimum value determined such that, for example, the stop torque can be canceled as quickly as possible when the engine rotation speed Ne falls below the resonance band so that the reverse rotation of the engine can be suppressed to ensure the predetermined NV performance. Although the stop torque cancellation determination value map of FIG. 18 is defined based on the rigidity value K1 and the hysteresis B in this example, the stop torque cancellation determination value map may be defined based on only one of the rigidity value K1 and the hysteresis B. Instead of the stop torque cancellation determination value map, an arithmetic expression etc. may be used for calculating the stop torque cancellation determination value Ne2 by using the rigidity value K1 or the hysteresis B as a parameter.

Figure 20:
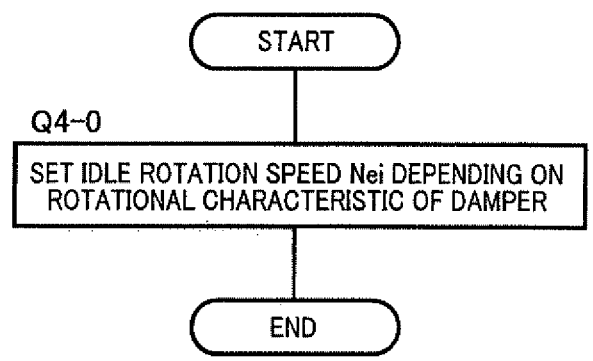
FIG. 20 is a diagram for explaining a signal process when an idle rotation control portion of FIG. 1 sets an idle rotation speed Nei depending on the rotational characteristics of the damper device.
Figure 21:
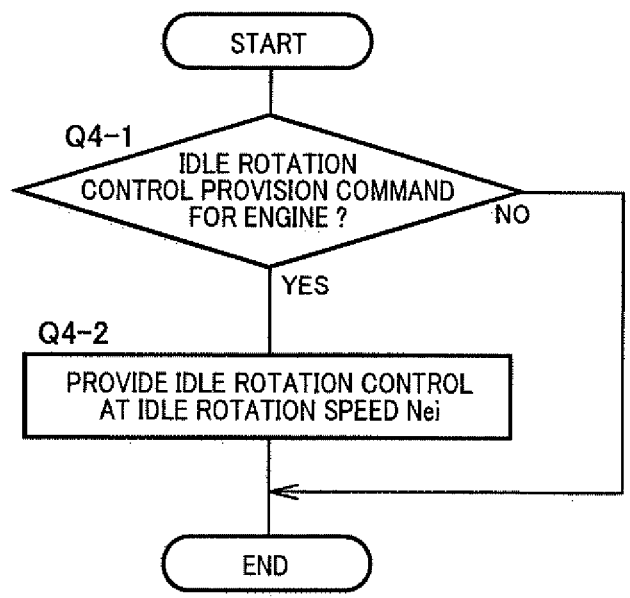
FIG. 21 is a flowchart for explaining an idle rotation control provided by the idle rotation control portion of FIG. 1.
Figure 22:
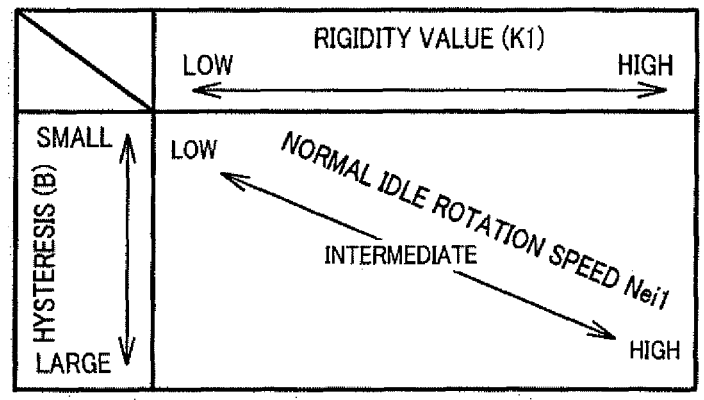
FIG. 22 is a diagram for explaining an example of a map used for setting a normal idle rotation speed Nei1 at step Q4-0 of FIG. 20.
Figure 23:
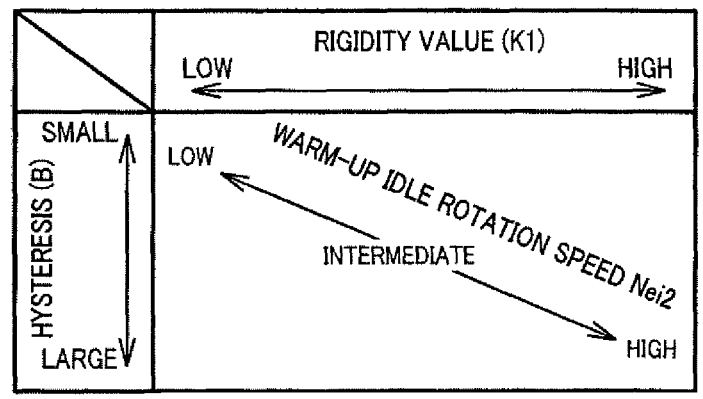
FIG. 23 is a diagram for explaining an example of a map used for setting a warm-up idle rotation speed Nei2 at step Q4-0 of FIG. 20.

The idle rotation control portion 102 controls an idle rotation speed Nei that is the engine rotation speed Ne during idling operation of the engine 12 when the engine output is not required such as when the accelerator operation amount Acc is zero and executes a signal process in accordance with Q4-0 to Q4-2 of FIGS. 20 and 21. Q4-0 of FIG. 20 is executed at a predetermined timing defined in advance such as when the engine 12 is started, and the rigidity value K1 and the hysteresis B of the damper device 26 are read from the characteristic storage portion 94 to set a normal idle rotation speed Nei1 and a warm-up idle rotation speed Nei2 in accordance with maps shown in FIGS. 22 and 23 defined in advance by using the rigidity value K1 and the hysteresis B as parameters. FIG. 22 is a map related to the normal idle rotation speed Nei1 and is a map at the time of normal idling other than during catalyst warm-up operation. FIG. 23 is a map related to the warm-up idle rotation speed Nei2 and is map at the time of warm-up idling during the catalyst warm-up operation. These maps are both defined such that the idle rotation speeds Nei1, Nei2 change continuously or step-by-step to a higher rotation speed as the rigidity value K1 becomes higher and the hysteresis B becomes larger. The warm-up idle rotation speed Nei2 of FIG. 23 is set higher than the normal idle rotation speed Nei1 of FIG. 22 for warming-up. The normal idle rotation speed Nei1 and the warm-up idle rotation speed Nei2 correspond to the control value related to the engine rotation speed Ne.

At Q4-1 of FIG. 21, it is determined whether an idle rotation control provision command is supplied for putting the engine 12 into an idling operation state when the vehicle 10 is stopped or coasting or during motor running when the second motor generator MG2 is used as the drive power source for running, and if the idle rotation control provision command is not supplied, the process is terminated, or if the idle rotation control provision command is supplied, Q4-2 is executed. At Q4-2, the normal idle rotation speed Nei1 or the warm-up idle rotation speed Nei2 set at Q4-0 is selected as the idle rotation speed Nei depending on which is executed between normal idling other than during the catalyst warm-up operation and warm-up idling during the catalyst warm-up operation, and the engine 12 and the first motor generator MG1 are controlled such that the engine rotation speed Ne becomes equal to the idle rotation speed Nei.

As described above, when the engine 12 is put into the idling operation state, the idle rotation speed Nei is controlled depending on the rigidity value K1 and the hysteresis B of the damper device 26 such that the idle rotation speed Nei becomes higher as the rigidity value K1 becomes higher and that the idle rotation speed Nei becomes higher as the hysteresis B becomes larger. Thus, although the higher rigidity value K1 of the damper device 26 makes the resonance band higher and the larger hysteresis B deteriorates the damping performance, the idle rotation speed Nei is made higher when the rigidity value K1 is high or the hysteresis B is large, and therefore, the idle rotation speed Nei can be made higher than the resonance band, so that the NV performance can be prevented from deteriorating due to resonance etc. Although the NV performance is more improved by suppression of resonance as the idle rotation speed Nei is increased, the idle rotation speed maps of FIGS. 22 and 23 have an optimum value determined in consideration of power performance, fuel consumption, etc. while suppressing the resonance at a rotation speed higher than the resonance band to ensure the predetermined NV performance, so that both the NV performance and the fuel consumption can be satisfied. Additionally, in this example, the normal idle rotation speed Nei1 and the warm-up idle rotation speed Nei2 are separately set depending on the rigidity value K1 and the hysteresis B of the damper device 26, so that the idle rotation speed Nei can more properly be controlled depending on whether the catalyst warm-up operation is performed. Although the idle rotation speed maps of FIGS. 22 and 23 are defined based on the rigidity value K1 and the hysteresis B in this example, the idle rotation speed maps may be defined based on only one of the rigidity value K1 and the hysteresis B. Instead of the idle rotation speed maps, an arithmetic expression etc. may be used for calculating the idle rotation speeds Nei1, Nei2 by using the rigidity value K1 or the hysteresis B as a parameter.

As described above, in the hybrid vehicle 10 of this example, the rotational characteristics such as the rigidity value K1 are detected by applying the torque Tin to the damper device 26 through the power running control of the first motor generator MG1 to measure the twist angle Φ while the rotation of the crankshaft 24 is locked by the meshing brake 36, and the various control values related to the engine rotation speed Ne are set based on the detected rotational characteristics, so that various controls related to the engine rotation speed Ne are properly provided based on the actual rotational characteristics regardless of variations due to an individual difference and temporal changes of the rotational characteristics etc. of the damper device 26. In other words, based on the rigidity value K1 and the hysteresis B that are the actual rotational characteristics of the damper device 26, the control values related to the engine rotation speed Ne, or specifically, the engine rotation speed Ne during predetermined engine running, the cranking termination determination value Ne1 at the start of the engine, the stop torque cancellation determination value Ne2 at the stop of engine rotation, and the idle rotation speed Nei at the time of the idle rotation control are set to optimal values depending on required performance such as power performance, NV performance, and fuel consumption.

Although the example of the present invention has been described in detail with reference to the drawings, this is merely an embodiment and the present invention can be implemented in variously modified and improved forms based on the knowledge of those skilled in the art.

REFERENCE SIGNS LIST

10: hybrid vehicle (vehicle) 12: engine 14: driving wheel 26: damper device (rotating member) 26a: first rotating element (coupling portion on the engine side) 36: meshing brake (rotation lock mechanism) 90: electronic control device (vehicle control device) 92: characteristic correspondence control portion 96: characteristic learning portion (characteristic detecting portion) 100: engine running control portion 102: idle rotation control portion 104: engine start control portion 106: engine stop control portion MG1: first motor generator (electric motor) MG2: second motor generator (second electric motor) Tin: input torque Φ: twist angle K1, K2, K3: rigidity value (rotational characteristic) B: hysteresis (rotational characteristic) Ne: engine rotation speed (control value) Ne1, Ne1a, Ne1b, Ne1c: cranking termination determination value (control value) Ne2, Ne2a, Ne2b, Ne2c: stop torque cancellation determination value (control value) Nei, Nei1, Nei2: idle rotation speed (control value)

What is claimed is:

1. A vehicle control device applied to a vehicle including an engine, an electric motor, and a rotating member disposed between the engine and the electric motor with a rotational characteristic related to an input torque,
the vehicle control device providing a predetermined control based on the rotational characteristic,
the vehicle including a rotation lock preventing rotation of a coupling portion of the rotating member coupled to the engine on the engine side of the rotating member in at least one direction, the vehicle control device comprising:
a characteristic detecting portion detecting the rotational characteristic by applying a torque to the rotating member from the electric motor to measure a twist angle of the rotating member while the rotation of the coupling portion is prevented by the rotation lock; and
a characteristic correspondence control portion setting a control value related to an engine rotation speed based on the rotational characteristic detected by the characteristic detecting portion to provide the predetermined control by using the control value.

2. The vehicle control device according to claim 1, wherein
the characteristic detecting portion detects as the rotational characteristic at least a rigidity value corresponding to a rate of a change in input torque to a change in the twist angle of the rotating member, and wherein
the characteristic correspondence control portion makes the control value higher or lower to avoid a resonance band determined depending on the rigidity value.

3. The vehicle control device according to claim 2, wherein
the characteristic detecting portion detects as the rotational characteristic at least a hysteresis that is a difference in input torque when the twist angle increases and decreases, and wherein
the characteristic correspondence control portion makes the control value higher when the hysteresis is large or makes the control value lower to avoid a resonance band.

4. The vehicle control device according to claim 1, wherein
the characteristic detecting portion detects as the rotational characteristic at least a hysteresis that is a difference in input torque when the twist angle increases and decreases, and wherein
the characteristic correspondence control portion makes the control value higher when the hysteresis is large or makes the control value lower to avoid a resonance band.

5. The vehicle control device according to claim 1, wherein
the vehicle is a hybrid vehicle having a second electric motor used as a drive power source coupled to a power transmission path between the rotating member and driving wheels, wherein
the characteristic detecting portion detects as the rotational characteristic a rigidity value corresponding to a rate of a change in input torque to a change in the twist angle of the rotating member and a hysteresis that is a difference in input torque when the twist angle increases and decreases, wherein
the characteristic correspondence control portion includes an engine running control portion that, when the second electric motor having a torque near zero is dragged and rotated while the engine is used as a drive power source for running, sets an engine rotation speed as the control value depending on the rigidity value and the hysteresis such that the engine rotation speed is increased when the rigidity value is high as compared to when the rigidity value is low, and the engine rotation speed is increased when the hysteresis is large as compared to when the hysteresis is small.

6. The vehicle control device according to claim 1, wherein
the characteristic detecting portion detects as the rotational characteristic a rigidity value corresponding to a rate of a change in input torque to a change in the twist angle of the rotating member and a hysteresis that is a difference in input torque when the twist angle increases and decreases, wherein
the characteristic correspondence control portion includes an engine start control portion setting a cranking termination determination value depending on the rigidity value and the hysteresis such that the cranking termination determination value is increased when the rigidity value is high as compared to when the rigidity value is low, and the cranking termination determination value is increased when the hysteresis is large as compared to when the hysteresis is small, and wherein the cranking termination determination value is used for terminating cranking in relation to an engine rotation speed when the engine is cranked and started by the electric motor.

7. The vehicle control device according to claim 1, wherein
the characteristic detecting portion detects as the rotational characteristic a rigidity value corresponding to a rate of a change in input torque to a change in the twist angle of the rotating member and a hysteresis that is a difference in input torque when the twist angle increases and decreases, wherein the characteristic correspondence control portion includes an engine stop control portion setting a stop torque cancellation determination value depending on the rigidity value and the hysteresis such that the stop torque cancellation determination value is increased when the rigidity value is high as compared to when the rigidity value is low, and the stop torque cancellation determination value is increased when the hysteresis is large as compared to when the hysteresis is small, wherein the stop torque cancellation determination value is used for cancelling a stop torque is related to an engine rotation speed when the stop torque is applied by the electric motor to the engine to stop rotation.

8. The vehicle control device according to claim 1, wherein the characteristic detecting portion detects as the rotational characteristic a rigidity value corresponding to a rate of a change in input torque to a change in the twist angle of the rotating member and a hysteresis that is a difference in input torque when the twist angle increases and decreases, wherein the characteristic correspondence control portion includes an idle rotation control portion setting an idle rotation speed as the control value depending on the rigidity value and the hysteresis such that the idle rotation speed is increased when the rigidity value is high as compared to when the rigidity value is low, and the idle rotation speed is increased when the hysteresis is large as compared to when the hysteresis is small.

9. The vehicle control device according to claim 8, wherein the idle rotation control portion separately sets an idle rotation speed during idling for a catalyst warm-up operation and an idle rotation speed during normal idling for other than the catalyst warm-up operation depending on the rigidity value and the hysteresis to control the idle rotation speed.

\* \* \* \* \*